US012755521B2

(12) United States Patent
Sajjan et al.

(10) Patent No.: US 12,755,521 B2
(45) Date of Patent: Oct. 6, 2026

(54) OBJECT DETECTION USING SENSOR FUSION FOR AUTONOMOUS SYSTEMS AND APPLICATIONS

(71) Applicant: NVIDIA Corporation, Santa Clara, CA (US)

(72) Inventors: Neeraj Sajjan, Santa Clara, CA (US); Mehmet K. Kocamaz, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 358 days.

(21) Appl. No.: 18/314,323

(22) Filed: May 9, 2023

(65) Prior Publication Data

US 2024/0378875 A1 Nov. 14, 2024

(51) Int. Cl.
*G06V 10/82* (2022.01)
*G06V 10/80* (2022.01)

(52) U.S. Cl.
CPC .............. *G06V 10/82* (2022.01); *G06V 10/80* (2022.01)

(58) Field of Classification Search
CPC ......... G06V 10/82; G06V 10/80; G06V 20/56
See application file for complete search history.

(56) References Cited

U.S. PATENT DOCUMENTS

| | | | |
|---|---|---|---|
| 9,747,527 B2 | 8/2017 | Baranowski et al. | |
| 10,997,461 B2 * | 5/2021 | Elluswamy | G06V 20/588 |
| 11,195,331 B2 | 12/2021 | Lee et al. | |
| 11,210,537 B2 | 12/2021 | Koivisto et al. | |
| 11,353,577 B2 * | 6/2022 | Liu | G01S 13/865 |
| 11,688,181 B2 | 6/2023 | Park et al. | |
| 11,704,890 B2 | 7/2023 | Yang et al. | |
| 11,802,969 B2 * | 10/2023 | Silva | B60W 60/00276 |
| 12,033,346 B2 * | 7/2024 | Fonseca | G06T 7/73 |
| 12,062,135 B2 * | 8/2024 | Fasola | G06T 17/05 |
| 12,112,625 B2 * | 10/2024 | Nagai | G08G 1/0116 |
| 12,271,796 B2 * | 4/2025 | Louizos | G06N 3/09 |
| 12,409,851 B2 * | 9/2025 | Schwindt | G01S 13/89 |

(Continued)

FOREIGN PATENT DOCUMENTS

WO WO-2016186267 A1 * 11/2016 ............. G07C 5/008

*Primary Examiner* — Akwasi M Sarpong
(74) *Attorney, Agent, or Firm* — IRON SUMMIT IP LLP

(57) ABSTRACT

In various examples, sensor fusion for autonomous or semi-autonomous systems and applications is described. Systems and methods are disclosed that use data pipelines to process sensor data generated using different types of sensors (e.g., image sensors, RADAR sensors, LiDAR sensors, etc.) in order to generate first data representing information associated with objects surrounding a vehicle. For instance, the information may represent values for parameters associated with the objects, such as locations of the objects, dimensions of the objects, velocities of the objects, orientations of the objects, classifications of the objects, and/or any of parameters. The systems and methods may then process the first data using one or more machine learning models (e.g., one or more deep neural networks) that are trained to fuse the information (e.g., the parameters) and output second data representing final information associated with the objects. The fused output may then be used to perform downstream operations.

20 Claims, 19 Drawing Sheets

(56) References Cited

U.S. PATENT DOCUMENTS

| | | | | |
|---|---|---|---|---|
| 2013/0141749 | A1* | 6/2013 | Chiba | H04N 1/4406 358/1.14 |
| 2016/0358074 | A1* | 12/2016 | Latapie | G06N 3/088 |
| 2018/0349782 | A1* | 12/2018 | Zheng | G05D 1/227 |
| 2019/0171912 | A1* | 6/2019 | Vallespi-Gonzalez | G06N 7/01 |
| 2019/0384309 | A1* | 12/2019 | Silva | G01S 17/931 |
| 2020/0250473 | A1* | 8/2020 | Elluswamy | G06N 3/08 |
| 2021/0306485 | A1* | 9/2021 | Urakawa | H04N 1/00493 |
| 2021/0342609 | A1* | 11/2021 | Smolyanskiy | G06V 10/764 |
| 2021/0358137 | A1* | 11/2021 | Lee | G06T 7/246 |
| 2021/0406560 | A1* | 12/2021 | Park | G06N 3/084 |
| 2022/0024485 | A1* | 1/2022 | Theverapperuma | G01C 21/3635 |
| 2022/0114301 | A1* | 4/2022 | Natarajan | G06F 30/27 |
| 2022/0230026 | A1* | 7/2022 | Valois | G06N 3/084 |
| 2022/0261593 | A1 | 8/2022 | Yu et al. | |
| 2022/0350337 | A1* | 11/2022 | Silva | B60W 60/00276 |
| 2023/0290168 | A1* | 9/2023 | Hasegawa | G06V 30/418 |
| 2023/0303084 | A1* | 9/2023 | Zhong | B60W 40/04 |
| 2023/0367303 | A1* | 11/2023 | Clark | G05B 19/4189 |
| 2024/0190461 | A1* | 6/2024 | Schwindt | G01S 13/867 |
| 2024/0265298 | A1* | 8/2024 | Capellier | G06N 20/00 |
| 2024/0312218 | A1* | 9/2024 | Krehl | G01S 13/931 |
| 2024/0317260 | A1* | 9/2024 | Donderici | B60W 60/0015 |
| 2024/0378875 | A1* | 11/2024 | Sajjan | G06V 20/58 |

* cited by examiner

OBJECT DETECTION USING SENSOR FUSION FOR AUTONOMOUS SYSTEMS AND APPLICATIONS

BACKGROUND

Vehicles or machines (e.g., autonomous vehicles or machines, semi-autonomous vehicles or machines, etc.) may use various types of sensors—such as image sensors, RADAR sensors, LiDAR sensors, ultrasonic sensors, and/or the like—to perceive environments surrounding the vehicles or machines. For instance, a vehicle may use a first processing pipeline to process first sensor data generated using a first type of sensor in order to determine first information associated with objects surrounding the vehicle. The vehicle may also use a second processing pipeline to process second sensor data generated using a second type of sensor in order to determine second information associated with the objects surrounding the environment. In order to create a more robust perception system, the vehicle may then fuse the first information with the second information in order to determine fused information associated with the objects.

For instance, the vehicle may use sensor data fusion in order to track objects located around the vehicle. For example, whenever an object is detected using one of the sensors, the vehicle (e.g., a component of the vehicle, such as a multi-sensor fusion module) may attempt to associate a detected object with an existing object track. In some examples, this association is performed by computing a cost, such as based on a measured distance between the detected object and the existing object track. For instance, if the cost is high (e.g., above a threshold cost), then the vehicle may generate a new object track for the detected object. However, if the cost is low (e.g., below the threshold cost), then the vehicle may associate the detected object with the existing object track.

When performing such processes, the vehicle may associate an object that is detected using multiple sensors with the same existing object track. For instance, and using the example above, if the first information generated using the first type of sensor and the second information generated using the second type of sensor are associated with the same object, then the first information is fused with the second information in order to generate the fused information for the object. The vehicle may then use this fused information to update the track associated with the object, such as to update the location of the object, the velocity of the object, the orientation of the object, and/or any other information associated with the object.

However, current systems used by vehicles perform a multi-step process in order to fuse the information generated using the different sensors. This may require a large number of heuristics for performing the associations, along with manually tuned parameters to set thresholds for creating, updating, and/or terminating tracks. Additionally, the heuristics and/or the parameters may need to be updated with other systems of the vehicle, when there is a change in a configuration to the fusion process, and/or when sensors of the vehicle are added, removed, and/or updated. Determining such heuristics and/or parameters, as well as updating such heuristics and/or parameters, may require many hours from developers of the systems as well as large amounts of computing resources to implement.

SUMMARY

Embodiments of the present disclosure relate to sensor fusion for autonomous or semi-autonomous systems and applications. Systems and methods are disclosed that use data pipelines to process sensor data generated using different types or modalities of sensors (e.g., image sensors, RADAR sensors, LiDAR sensors, ultrasonic sensors, etc.) in order to generate first data representing information associated with objects surrounding a vehicle. For instance, the information may represent values for parameters associated with the objects, such as locations of the objects, dimensions of the objects, velocities of the objects, orientations or poses of the objects, classifications of the objects, and/or any other parameters. The systems and methods may then process the first data using one or more machine learning models (e.g., one or more deep neural networks) that are trained to fuse the information (e.g., the values of the parameters) and output second data representing final information associated with the objects. In some examples, the first data is processed before being input into the machine learning model (s). For example, the first data may be processed to generate grids (e.g., top down or bird's-eye-view grids) that represent the parameters, where the grids are then input into and processed by the machine learning model(s).

In contrast to conventional systems, such as those described above, the current systems, in some embodiments, are able to perform data fusion without manually designing a component (e.g., a multi-sensor fusion module) with heuristics, algorithms, and parameters. For instance, designing such a component may take many iterations to get the heuristics, algorithms, and parameters correct. Additionally, whenever there is an update to a vehicle, such as an update to the systems that use the fused data and/or an update one of the sensors that generate the data to be fused, the heuristics, algorithms, and/or parameters may also need to be updated. In contrast, the current systems train a machine learning model(s) using training data, where the machine learning model(s) is then used to fuse the data. Training such a machine learning model(s) to perform data fusion may require less time and/or computing resources. Additionally, the trained machine learning model(s) may not need to be updated with other systems and/or when sensors are added or removed. Furthermore, the trained machine learning model(s) may be more accurate and precise when performing sensor data fusion as compared to using manually designed or hardcoded components.

BRIEF DESCRIPTION OF THE DRAWINGS

The present systems and methods for sensor fusion for autonomous or semi-autonomous systems and applications are described in detail below with reference to the attached drawing figures, wherein.

DETAILED DESCRIPTION

Figure 1:
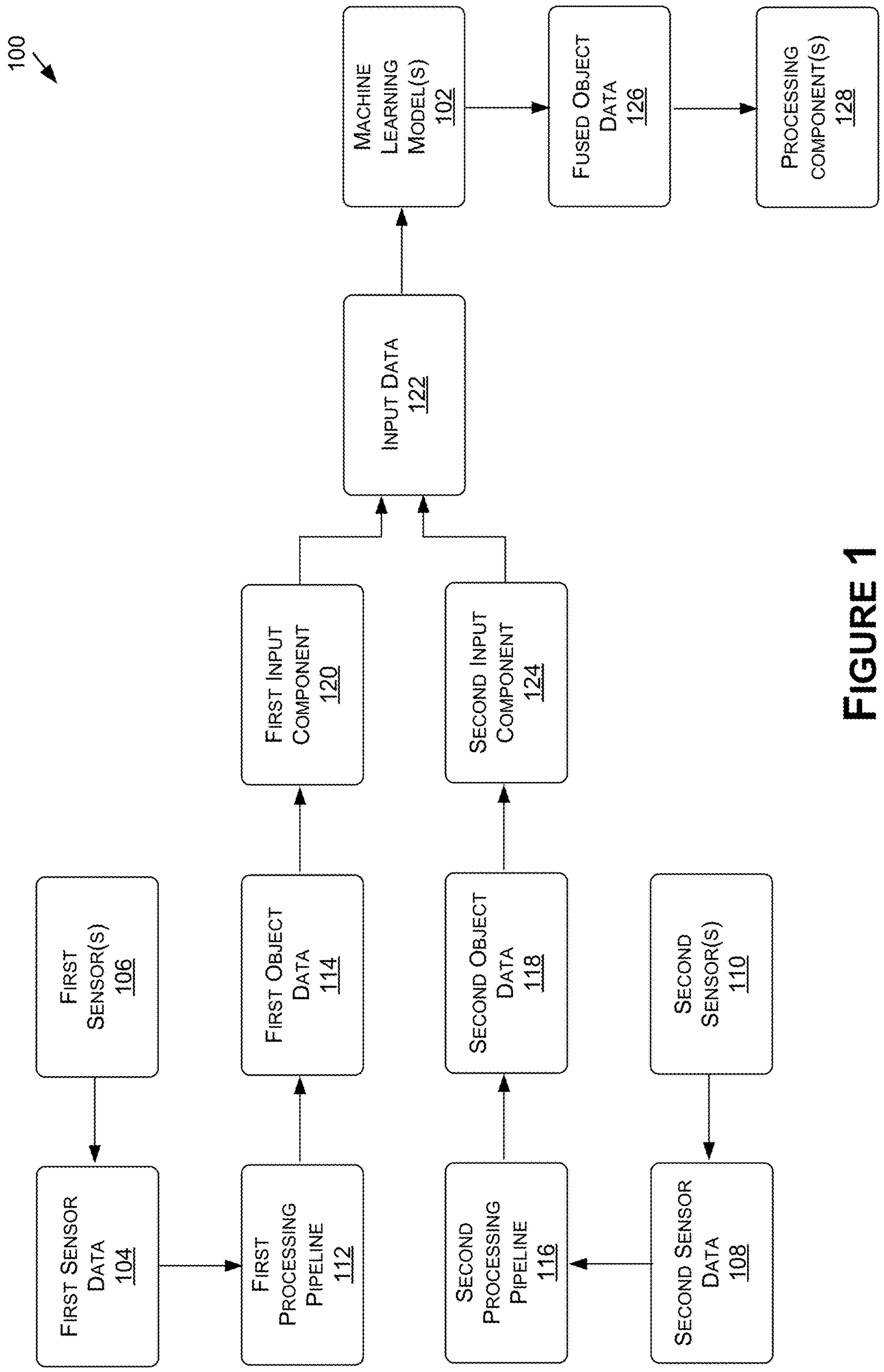
FIG. 1 illustrates an example data flow diagram for a process of performing data fusion using a machine learning model(s), in accordance with some embodiments of the present disclosure.

Systems and methods are disclosed related to sensor fusion for autonomous or semi-autonomous systems and applications. Although the present disclosure may be described with respect to an example autonomous or semi-autonomous vehicle or machine 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), non-autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to data fusion in machine applications, this is not intended to be limiting, and the systems and methods described herein may be used in augmented reality, virtual reality, mixed reality, robotics, security and surveillance, autonomous or semi-autonomous machine applications, and/or any other technology spaces where data fusion may be used.

For instance, a system(s) may receive, generate, and/or obtain sensor data generated using various types or modalities of sensors. As described herein, the sensor data may include, but is not limited to, image data generated using one or more image sensors, RADAR data generated using one or more RADAR sensors, LiDAR data generated using one or more LiDAR sensors, ultrasonic data generated using one or more ultrasonic sensors, and/or any other type of sensor data generated using any other type of sensor. The system(s) may then process the sensor data using processing pipelines in order to determine information associated with the environment surrounding the vehicle. As described herein, the information may include values for parameters associated with one or more objects located proximate to the vehicle. For instance, the parameters associated with an object may include, but are not limited to, the location of the object (e.g., a x-coordinate location, a y-coordinate location, a z-coordinate location, etc.), dimensions of the objects (e.g., a height, a width, a length, etc.), a velocity of the object (e.g., a velocity in the x-coordinate direction, a velocity in the y-coordinate direction, etc.), an orientation or pose of the object, a classification of the object (e.g., a vehicle, a pedestrian, an animal, a structure, etc.), and/or any other parameters.

For example, the vehicle may process, using a first processing pipeline, first sensor data generated using one or more first sensors. Based on the processing, the first processing pipeline may output first data representing first information associated with one or more first objects surrounding the vehicle. The vehicle may also process, using a second processing pipeline, second sensor data generated using one or more second sensors. Based on the processing, the second processing pipeline may output second data representing second information associated with one or more second objects surrounding the vehicle. In some examples, the first object(s) is the same as the second object(s). In some examples, at least one object from the first object(s) may be different than at least one object from the second object(s). In any example, the sensor fusion process may include any number of sensor processing pipelines from any number and type of sensors.

The system(s) may then generate input data using the data output from the processing pipelines. In some examples, the input data may represent one or more grids, such as one or more bird's-eye-view (BEV) or top-down view grids, that represent the parameters associated with the object(s). For instance, and using the example above, if the first information represents values for ten parameters associated with the first object(s), then the system(s) may generate ten grids using the first information, where each grid represents a respective type of parameter. Additionally, if the second information also represents values for ten parameters associated with the second object(s), then the system(s) may generate ten additional grids using the second information, where each grid again represents a respective type of parameter. While this example describes the information representing ten different types of parameters and the system(s) generating a respective grid for each type of parameter, in other examples, the information may represent any number of parameters and/or the system(s) may generate a respective grid for more than one type of parameter (e.g., a combined parameter grid).

The system(s) may use the location(s) of the object(s) within the environment to generate the grids. For instance, and for a grid, the grid may be separated into a number of portions (e.g., cells), where each portion represents a respective area within the environment. For a first, non-limiting example, if the entire grid represents a 400 meter by 400 meter section of the environment, then the grid may be separated such that each portion represents a 0.5 meter by 0.5 meter area of the environment. For a second, non-limiting example, if the entire grid again represents a 400 meter by 400 meter section of the environment, then the grid may be separated such that each portion represents a 1 meter by 1 meter area of the environment. However, in other examples, the grids may represent a different size section of the environment and/or the portions may each represent a different sized area of the environment.

The system(s) may then use the location(s) of the object (s) to input the values for the parameters within the grids. For example, and for an object, the system(s) may use the location of the object to determine that the object is associated with portions of the grids (e.g., portions that represent the area of the environment for which the object is located). The system(s) may then input the values for the parameters for the object into the portions of the grids. For example, the system(s) may input a first value for a first parameter (e.g., the x-coordinate location) into a portion of a first grid, input a second value for a second parameter (e.g., the y-coordinate location) into a corresponding portion of a second grid, input a third value for a third parameter (e.g., the z-coordinate location) into a corresponding portion of a third grid, and/or so forth. The system(s) may then perform similar processes to input the values for the parameters for one or more other objects (e.g., each object) into the grids.

In some examples, since the portions of the grids represent areas of the environment, a single portion of a grid may be associated with locations of multiple objects (which is referred to, in some examples, as "overlapping objects") located within an area of the environment. As such, the system(s) may perform one or more processes in order to represent overlapping objects within the environment. For instance, and using the example above where the system(s) generates ten grids for ten different parameters of objects, the system(s) may generate a first set of ten grids to represent values of parameters associated with a first object(s) located within the environment and a second set of ten grids to represent values of parameters associated with a second object(s) located within the environment. This way, if a portion is associated with two overlapping objects, the portions of the first set of grids represent the values of the parameters for a first object of the overlapping objects and the corresponding portions of the second set of grids represent the values of the parameters for a second object of the overlapping objects.

The system(s) may then input the input data into a machine learning model(s) that is trained to perform data fusion. For instance, the machine learning model(s) may process the input data and, based at least on the processing, output data representing fused information associated with the object(s) located within the environment. In some examples, the data that is output by the machine learning model(s) may be similar to the data that is input into the machine learning model(s). For instance, the data output by the machine learning model(s) may represent a number of grids, where an individual grid is associated with a type of parameter. For example, and for an object, a portion of a first grid may represent a first value of a first parameter associated with the object (e.g., the x-coordinate location), a corresponding portion of a second grid may represent a second value of a second parameter associated with the object (e.g., the y-coordinate location), a corresponding portion of a third grid may represent a third value of a third parameter associated with the object (e.g., a z-coordinate location), and/or so forth.

In some examples, the system(s) (and/or another system(s)) may train the machine learning model(s) to perform data fusion. For instance, and as described in more detail here, the system(s) may train the machine learning model(s) using at least training sensor data generated by different types of sensors and ground truth data representing actual values of parameters associated with objects represented by the training sensor data. Additionally, during the training, the system(s) may generate and input data (e.g., input data that represents grids) that is similar to the data that is input into the machine learning model(s) when being used by vehicles or machines.

The systems and methods described herein may be used by, without limitation, non-autonomous vehicles, semi-autonomous vehicles (e.g., in one or more adaptive driver assistance systems (ADAS)), autonomous vehicles, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems performing data fusion, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as large language models (LLMs) that process text, audio, and/or sensor data, systems for performing light transport simulation, systems for performing collaborative content creation for 3D assets, systems implemented at least partially using cloud computing resources, and/or other types of systems.

FIG. 1 illustrates an example data flow diagram for a process 100 of performing data fusion using a machine learning model(s) 102, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

The process 100 may include receiving first sensor data 104 generated using one or more first sensors 106 and receiving second sensor data 108 generated using one or more second sensors 110. As described herein, the first sensor(s) 106 may include a first type of sensor and the second sensor(s) 110 may include a second, different type of sensor. For a first example, the first sensor(s) 106 may include an image sensor(s) and the second sensor(s) 110 may include a RADAR sensor(s). For a second example, the first sensor(s) 106 may again include an image sensor(s) and the second sensor(s) 110 may include a LiDAR sensor(s). While these are just a couple examples of types of sensors associated with the first sensor(s) 106 and the second sensor(s) 110, in other examples, the first sensor(s) 106 and/or the second sensor(s) 110 may include any type of sensor.

Figure 2:
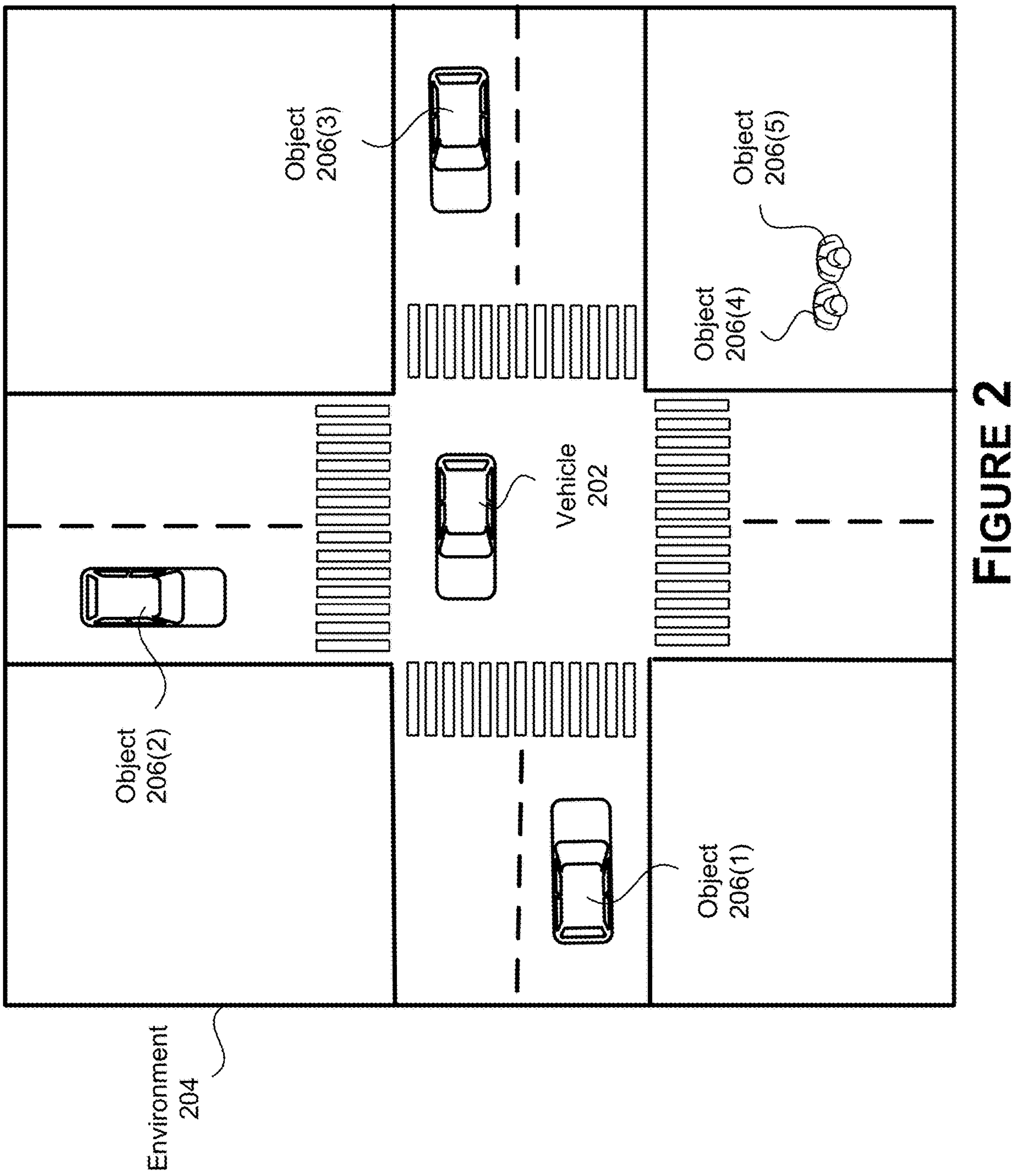
FIG. 2 illustrates an example of a vehicle navigating around an environment, in accordance with some embodiments of the present disclosure.

For instance, FIG. 2 illustrates an example of a vehicle 202 navigating around an environment 204, in accordance with some embodiments of the present disclosure. In the example of FIG. 2, while navigating around the environment 204, the vehicle 202 may use sensors (e.g., the first sensor(s) 106, the second sensor(s) 110, etc.) to generate sensor data (e.g., the sensor data 104, the sensor data 108, etc.) representing a number of objects 206(1)-(5) (also referred to singularly as "object 206" or in plural as "objects 206") surrounding the vehicle 202. While the example of FIG. 2 illustrates the objects 206(1)-(3) as including other vehicles and the objects 206(4)-(5) as including pedestrians, in other examples, the objects 206 may include any other type of object (e.g., structures, street signs, animals, etc.). Additionally, while the example of FIG. 2 describes the sensor data as representing five objects 206, in other examples, the vehicle 202 may generate sensor data representing any number of objects (e.g., one object, ten objects, fifty objects, one hundred objects, one thousand objects, etc.). Further, although described as detecting, tracking, or determining parameters for objects, objects is to extend to static objects, dynamic objects, undulations/perturbations in a surface (such as a driving surface), cavities or holes in a surface, and/or features (road markings, etc.) within the environment.

Referring back to the example of FIG. 1, the process 100 may include a first processing pipeline 112 processing the first sensor data 104 and, based on the processing, outputting first object data 114. For instance, the first processing pipeline 112 may include one or more models, one or more neural networks, one or more algorithms, and/or any other component that processes the first sensor data 104 in order to determine first information associated with one or more first objects located within the environment, where the first object data 114 represents the first information. In some examples, the first information may include first values for first parameters associated with the first object(s). As described herein, parameters associated with an object may include, but are not limited to, a x-coordinate location, a y-coordinate location, a z-coordinate location, a height, a width, a length, a velocity in the x-direction, a velocity in the y-direction, an orientation, a pose, a classification, and/or any other parameter.

The process 100 may include a second processing pipeline 116 processing the second sensor data 108 and, based on the processing, outputting second object data 118. For instance, the second processing pipeline 116 may include one or more models, one or more neural networks, one or more algorithms, and/or any other component that processes the second sensor data 108 in order to determine second information associated with one or more second objects located within the environment, where the second object data 118 represents the second information. In some examples, the second information may include second values for second parameters associated with the second object(s). In some examples, the first object(s) associated with the first information may be the same as the second object(s) associated with the second information. In some examples, one or more objects from the first object(s) associated with the first information may be different than one or more objects from the second object(s) associated with the second information.

In some examples, based on the types of sensors 106 and 110 used to generate the sensor data 104 and 108, the first object data 114 generated using the first processing pipeline 112 and/or the second output data 118 generated using the second processing pipeline 116 may not represent one or more values for one or more of the parameters described herein. For a non-limiting example, the second information may not include a value(s) for the height(s) associated with the second object(s) if values for such a parameter is difficult to determine based on the sensor modality that generated the data.

Figure 3A:
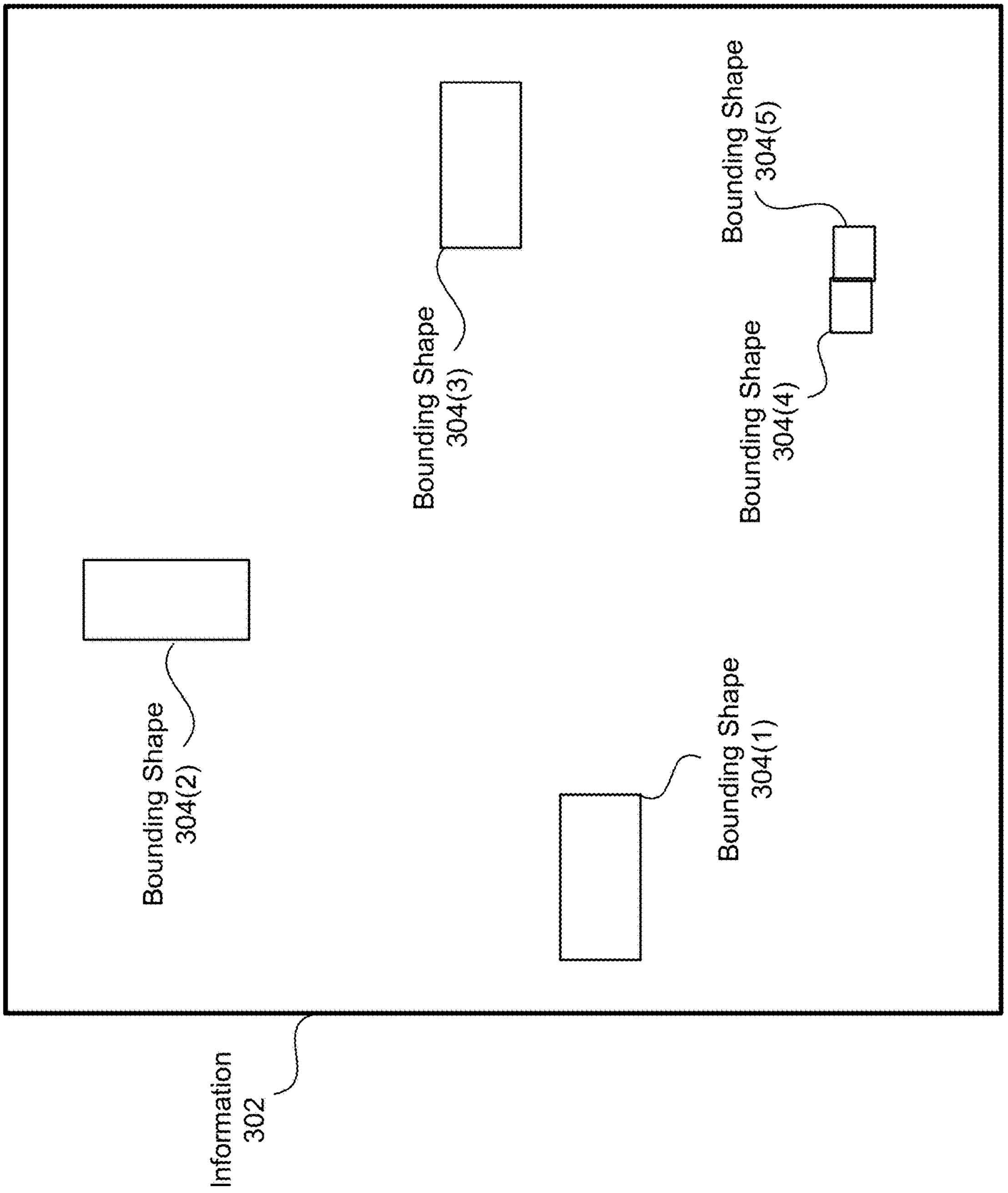
FIGS. 3A-3B illustrate examples of visualizations of outputs associated with processing pipelines, where the outputs indicate information associated with objects, in accordance with some embodiments of the present disclosure.
Figure 3B:
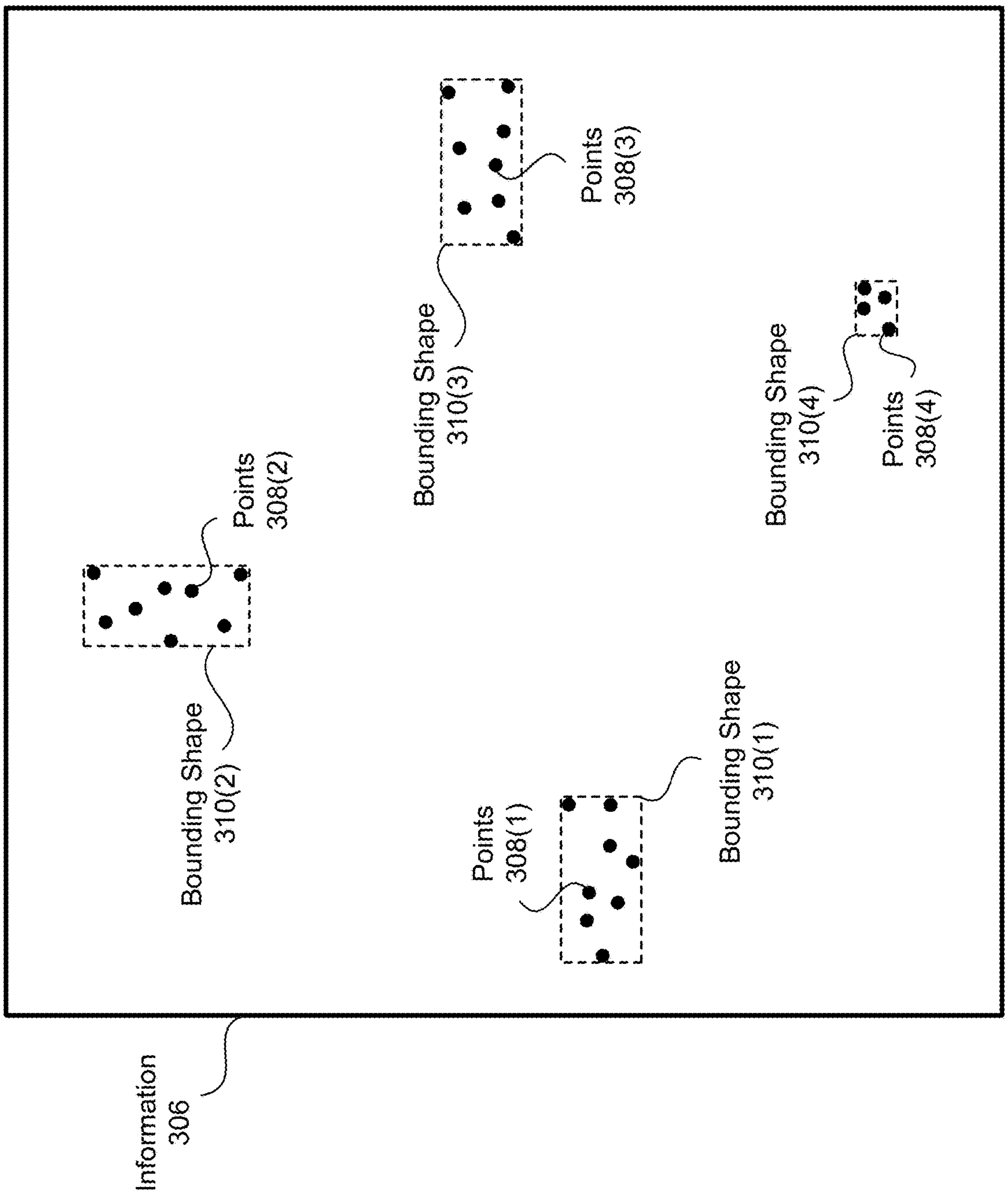

For instance, FIGS. 3A-3B illustrate examples of outputs associated with processing pipelines, where the outputs indicate information associated with objects, in accordance with some embodiments of the present disclosure. In the example of FIG. 3A, the first processing pipeline 112 may have processed first sensor data (e.g., the first sensor data 104) and, based at least on the processing, output first data (e.g., the first object data 114) representing first information 302 for one or more of the objects 206. In some examples, the first processing pipeline 112 may be associated with processing image data generated using an image sensor(s). As such, and as shown, the information 302 may include at least bounding shapes 304(1)-(5) (also referred to singularly as "bounding shape 304" or in plural as "bounding shapes 304") indicating the locations of the objects 206. The information 302 may then be used to determine the first values of the first parameters associated with the objects 206.

For example, and for an object 206, the center of the bounding shape 304 may be used to determine the value of the the x-coordinate location and the value of the y-coordinate location associated with the object 206. In some examples, the x-coordinate location and the y-coordinate location is with respect to the vehicle (e.g., in an ego coordinate frame, centered on an origin located on the ego-vehicle—such as, without limitation, at a center of a rear axle of the ego-vehicle), which is be located at a center of the illustration of the information 302. The length and width of the bounding shape 304 may also be used to respectively determine the value of the width and the value of the length associated with the object 206. Additionally, while the example of FIG. 3A illustrates the information 302 as including two-dimensional (2D) bounding shapes 304 associated with the objects 206, in other examples, the information 302 may include three-dimensional (3D) bounding shapes (e.g., cuboids) associated with the objects 206. In such examples, a center of the 3D bounding shape may be used to determine the value of the z-coordinate location of the object and the height of the 3D bounding shape may be used to determine the value of the height of the object.

The bounding shape 304 may also be used to determine the value of the orientation associated with the object. For example, objects 206 that are oriented directly in the negative x-direction may be associated with an orientation of 0 degrees. The angles associated with the orientations may then increase in the counterclockwise direction. For instance, objects 206 that are oriented directly in the negative y-direction may be associated with an orientation of 90 degrees, objects 206 that are oriented directly in the positive x-direction may be associated with an orientation of 180 degrees, and objects 206 oriented in the positive y-direction may be associated with an orientation of 270 degrees (and/or −90 degrees). While this is just one example technique for determining values (e.g., angles) associated with the orientations of the objects 206, in other examples, the values may be determined using additional and/or alternative techniques (e.g., the angles may increase in the clockwise direction, the positive x-direction may be associated with an orientation of 0 degrees, etc.).

The first processing pipeline 112 may additionally output values for additional parameters associated with the objects 206. For example, and for an object, the first processing pipeline 112 may output a value for the velocity in the x-direction and a value for the velocity in the y-direction (and/or a value for the velocity in the z-direction). In such examples, the first processing pipeline 112 may use a single representation (e.g., a single frame) of the sensor data or, such as to increase the accuracy, the first processing pipeline 112 may use multiple representations (e.g., multiple frames generated over a period of time) of the sensor data. The first processing pipeline 112 may also output a value associated with the classification of the object (which his described in more detail herein).

In the example of FIG. 3B, a second processing pipeline 116 may have processed second sensor data (e.g., the second sensor data 108) and, based on the processing, output second data (e.g., the second object data 118) representing second information 306 for one or more of the objects 206. In some examples, the second processing pipeline 116 may be associated with processing RADAR data generated using a RADAR sensor(s) and/or LiDAR data generated using a LiDAR sensor(s). As such, and as shown, the information 306 may include at least points 308(1)-(4) (also referred to singularly as "point 308" or in plural as "points 308") associated with the objects 206(1)-(4). However, the information 306 may not include points associated with the object 206(5) (e.g., the object 206(5) may have been blocked from the sensor(s) by the object 206(4)). The information 302 may then be used to determine second values for second parameters associated with the objects 206.

For example, the second processing pipeline 116 (and/or another component) may determine bounding shapes 310(1)-(4) (also referred to singularly as "bounding shape 310") or in plural as "bounding shapes 310") associated with the objects 206(1)-(4) using the points 308. For instance, and for a bounding shape 310, the x-coordinate value and the y-coordinate value of a centroid is computed and then the dimensions (e.g., the length and the width) of the bounding shape 310 are also computed. In some examples, to perform these computations, the minimum and maximum deviations from the points 308 associated with the object 206 are computed. The minimum and maximum deviations give the left and right extremes of the bounding shape 308. The length and width are then computed by subtracting the minimum deviation from the maximum deviation. Additionally, the offset to a tracking point provides the centroid of the bounding shape 310. While this is just one example technique for determining the bounding shape 310 for the object 206, in other examples, additional and/or alternative techniques may be used to determine the bounding shape 310 for the object.

The bounding shapes 310 may then be used to determine the second parameters for the objects 206(1)-(4). For instance, and for an object 206, the center of the bounding shape 310 may be used to determine the value of the x-coordinate location and the value of the y-coordinate location associated with the object 206. In some examples, the x-coordinate location and the y-coordinate location is again with respect to the vehicle, which is be located at a center of the illustration of the information 306. The width and length of the bounding shape 310 may be used to respectively determine the value of the width and the value of the length associated with the object 206. Additionally, the second processing pipeline 116 may output additional information representing the value of the velocity in the x-direction, the value of the velocity in the y-direction, the value of the orientation, and/or the value of the classification associated with the object 206. Furthermore, similar processes may be used to determine values for the second parameters associated with the one or more (e.g., each) of the other objects 206(1)-(4).

As described herein, the second processing pipeline 116 may not determine one or more values for one or more of the parameters determined by the first processing pipeline 112 since the second sensor data is different than the first sensor data. For example, the second processing pipeline 116 may be unable to determine at least the value of the z-coordinate location and the value of the height associated with the objects 206(1)-(4). However, and as described in more detail herein, the machine learning model(s) 102 may still be able to fuse the data even without this information.

Referring back to the example of FIG. 1, the process 100 may include a first input component 120 processing the first object data 114 and, based at least on the processing, outputting first input data 122 associated with the first sensor(s) 106. The process 100 may further include a second input component 124 processing the second object data 118 and, based at least on the processing, outputting second input data 122 associated with the second sensor data 108. While the example of FIG. 1 illustrates the first input component 120 as being separate from the second input component 124, in other examples, the first input component 120 and the second input component 124 may be combined into a single input component.

As described herein, in some examples, the input data 122 may represent one or more grids, such as one or more BEV grids, that represent the values of the parameters associated with the objects. In some examples, the number of grids generated by the first input component 120 and/or the second input component 124 may correspond to the number of parameters associated with the object(s). For a first example, if the first object data 114 represents values for ten parameters associated with the first object(s), then the first input component 120 may generate ten grids, where each grid is associated with a respective parameter. For a second example, if the second object data 118 represents values for eight parameters, but values for two extra parameters cannot be determined based on the second sensor data 108, then the second input component 124 may again generate ten grids, where eight of the grids are associated with the eight determined parameters and two of the grids are associated with the two undetermined parameters (which is described in more detail herein).

For instance, and using the ten parameter examples above, the first input component 120 may generate a first grid representing the value(s) of the x-coordinate location(s) of the first object(s), a second grid representing the value(s) of the y-coordinate location(s) of the first object(s), a third grid representing the value(s) of the z-coordinate location(s) of the first object(s), a fourth grid representing the value(s) of the width(s) of the first object(s), a fifth grid representing the value(s) of the length(s) of the first object(s), a sixth grid representing the value(s) of the height(s) of the first object(s), a seventh grid representing the value(s) of the x-direction velocity(ies) of the first object(s), an eighth grid representing the value(s) of the y-direction velocity(ies) of the first object(s), a ninth grid representing the value(s) of the orientation(s) of the first object(s), and a tenth grid representing the value(s) of the classification(s) associated with the first object(s). Additionally, the second input component 124 may perform similar processes to generate grids representing similar parameters for the second object(s).

In some examples, a grid may be broken into various portions (e.g., cells), where each portion is associated with an area of the environment surrounding the vehicle. For a first example, if a grid represents a 400 meter by 400 meter section of the environment, the grid may be broken into 640,000 portions, where each portion is associated with a 0.5 meter by 0.5 meter area of the environment. In such an example, the input data 122 for a grid may include a size of 800×800. Additionally, if each sensor type is associated with ten parameters (e.g., ten channels), where there are two different sensor types, then the input data 122 may include 800×800×20. For a second example, and again if the grid represents a 400 meter by 400 meter section of the environment, the grid may be broken into 160,000 portions, where each portion is associated with a 1 meter by 1 meter area of the environment. In such an example, the input data 122 for a grid may include a size of 400×400. Additionally, if each sensor type is associated with ten parameters (e.g., ten channels), where there are two different senor types, then the input data 122 may include 400×400×20.

The first input component 120 and/or the second input component 124 may then use the locations of the objects along with the portions when generating the input data 122. For example, and for a grid, the first input component 120 (and/or similarly the second input component 124) may determine a portion of the grid that is associated with a location of an object. In some examples, the first input component 120 determines the portion of the grid using the value of the x-coordinate location and the value of the y-coordinate location associated with the object (which is described in more detail herein). The first input component 120 may then input the value associated with the parameter into the portion of the grid. Additionally, the first input component 120 may perform similar processes to input a value(s) associated with the parameter for an additional object(s). Furthermore, the first input component 120 may perform similar processes to input the values for the remaining parameters for the first object(s) into the other grids.

In some examples, the first input component 120 (and/or similarly the second input component 124) may use various techniques to input the values of the parameters. For instance, the first input component 120 may determine a distance between a center of a portion of a grid that is associated with an object and the value of the x-coordinate location of the object. The first input component 120 may then input a value associated with the distance into the portion of the grid that is associated with the x-coordinate location parameter. The first input component 120 may also determine a distance between a center of a portion of a grid that is associated with the object and the value of the y-coordinate location of the object. The first input component 120 may then input a value associated with the distance into the portion of the grid that is associated with the y-coordinate location parameter.

Additionally, the first input component 120 may then input the values for the z-coordinate location, the height, the width, the length, the velocity in the x-direction, the velocity in the y-direction, and the orientation into corresponding portions of the grids that are associated with those parameters. Furthermore, the first input component 120 may determine a value associated with the classification of the object. In some examples, the value may be associated with a range, such as a range between 0 and 1, where different classifications are associated with different values. For example, a vehicle may be associated with a value of 0.1, a pedestrian may be associated with a value of 0.3, an animal may be associated with a value of 0.9, and/or so forth. The first input component 120 may then input the value into a corresponding portion of a grid that is associated with the classification parameter. Using similar processes, the first input component 120 may input the values for the parameters associated with the other first object(s) into the grids.

In some examples, more than one object (e.g., overlapping objects) may be associated with a same portion of the grids. For example, if the portions of the grid represent a 1 meter by 1 meter area of the environment, more than one object may be located within the 1 meter by 1 meter area. In such examples, the first input component 120 (and/or similarly the second input component 124) may use one or more techniques to represent both of the overlapping objects by the input data 122. For example, the first input component 120 may generate a first set of grids (e.g., ten grids) that represent the values of the parameters for a first object of the overlapping objects and also generate a second set of grids (e.g., ten grids) that represent the values of the parameters for a second object of the overlapping objects. While this example describes generating two sets of grids for two overlapping objects, in some examples, the first input component 120 may generate any number of sets of grids for any number of overlapping objects.

Figure 4A:
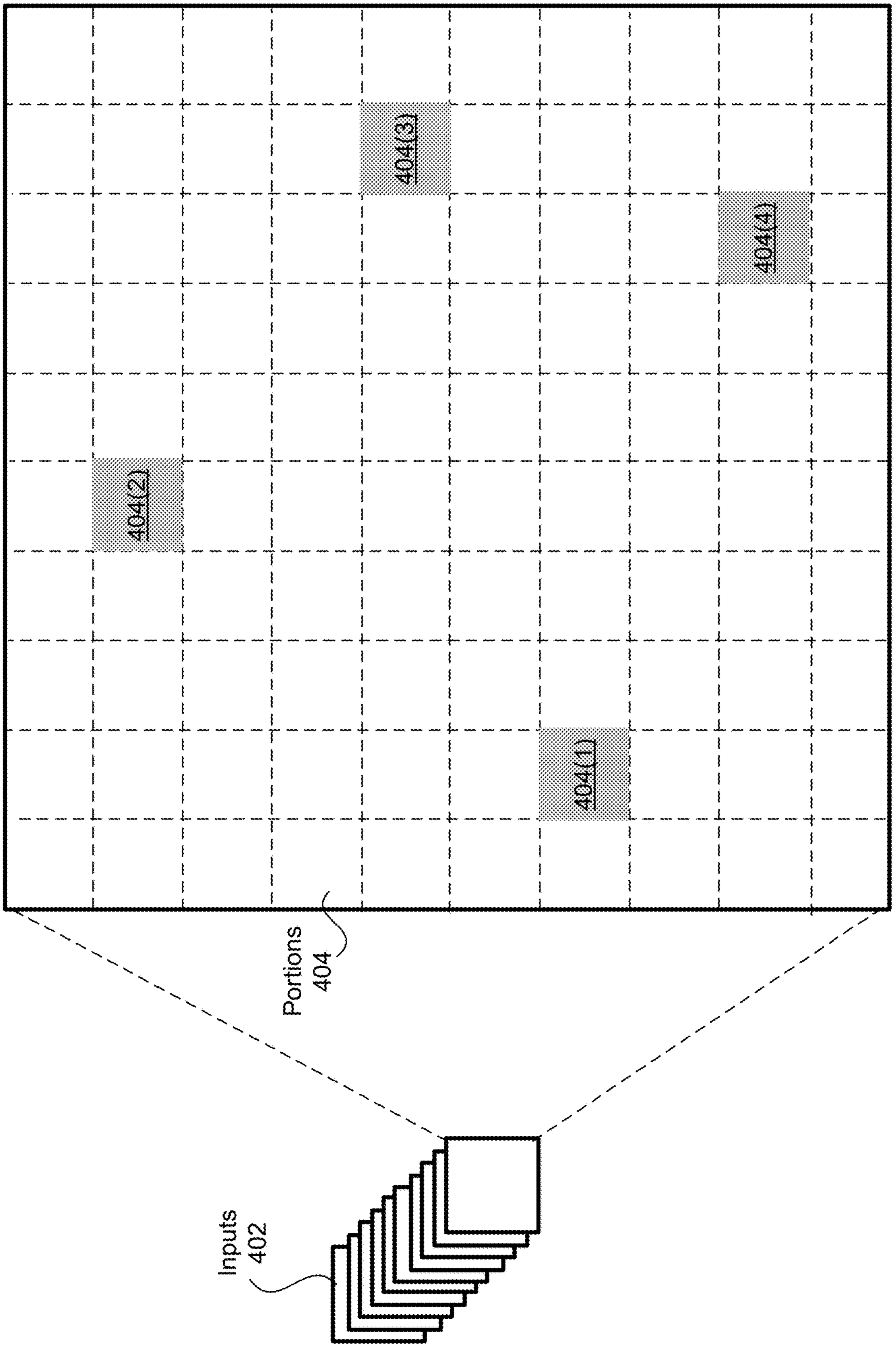
FIGS. 4A-4D illustrate example visualizations of generating inputs for a machine learning model(s), in accordance with some embodiments of the present disclosure.

For instance, FIGS. 4A-4D illustrate example visualizations of generating inputs for the machine learning model(s) 102, in accordance with some embodiments of the present disclosure. As shown by the example of FIG. 4A, the first input component 120 may generate a first set of inputs 402 (although only one is labeled for clarity reasons) that represent values of the parameters associated with the objects 206(1)-(4) as determined by the first processing pipeline 112. For instance, a first input 402 may represent the values the x-coordinate locations of the objects 206(1)-(4), a second input 402 may represent the values of the y-coordinate locations of the objects 206(1)-(4), a third input 402 may represent the values of the z-coordinate locations of the objects 206(1)-(4), a fourth input 402 may represent the value of the widths of the objects 206(1)-(4), a fifth input 402 may represent the values of the lengths of the objects 206(1)-(4), a sixth input 402 may represent the values of the heights of the objects 206(1)-(4), a seventh input 402 may represent the values of the x-direction velocities of the objects 206(1)-(4), an eighth input 402 may represent the values of the y-direction velocities of the objects 206(1)-(4), a ninth input 402 may represent the values of the orientations of the objects 206(1)-(4), and a tenth input 402 may represent the values of the classifications associated with the objects 206(1)-(4). While the example of FIG. 4A (as well as the examples of FIGS. 4B-4D) represents the set of inputs 402 as including ten inputs 402 associated with ten different parameters, in other examples, the set of inputs may include any other number of inputs associated with any number of parameters.

In the example of FIG. 4A (as well as the examples of FIGS. 4B-4D), an input 402 includes a grid (e.g., a BEV grid) representing the environment 204 for which the vehicle 202 is navigating. For instance, the grid may represent a rectangular section of the environment 204 surrounding the vehicle 202 (e.g., the vehicle may be located at the middle of the rectangular section), where a first dimension of the rectangle represents a first distance within the environment 204 and a second dimension of the rectangle represents a second distance within the environment. However, in other examples, the grid may include any other shape (e.g., a circle, a triangle, a pentagon, a hexagon, etc.). Additionally, the grid may include a number of portions 404 (although only a few are labeled for clarity reasons) (also referred to singularly as "portion 404" or in plural as "portions 404"), where each portion 404 represents an area of the environment 204. While the example of FIG. 4A illustrates the grid as including one hundred portions 404, in other examples, the grid may include any other number of portions.

The first input component 120 may then use the locations of the objects 206(1)-(4) to input the values associated with the parameters into the inputs 402. For example, and for the object 206(1), the first input component 120 may use the location of the object 206(1) (e.g., the value of the x-coordinate location and the value of the y-coordinate location) to determine that the object 206(1) is associated with the portion 404(1) of the grid. In other words, the portion 404(1) of the grid may represent the area of the environment 204 for which the object 206(1) is located. As such, the first input component 120 may input a value of a parameter associated with the object 206(1) into the portion 404(1) of the grid. Additionally, the first input component 120 may use similar processes to input additional values for additional parameters associated with the object 206(1) into corresponding portions 404(1) of the other grids.

As further shown by the example of FIG. 4A, the first input component 120 may perform similar processes to determine that the object 206(2) is associated with the portions 404(2) of the grids. The first input component 120 may then input the values of the parameters associated with the object 206(2) into the portions 402(2) of the grids. Additionally, the first input component 120 may perform similar processes to determine that the object 206(3) is associated with the portions 404(3) of the grids. The first input component 120 may then input the values of the parameters associated with the object 206(3) into the portions 404(3) of the grids. Furthermore, the first input component 120 may perform similar processes to determine that the object 206(4) is associated with the portions 404(4) of the grids. The first input component 120 may then input the values of the parameters associated with the object 206(4) into the portions 404(4) of the grids.

Figure 4B:
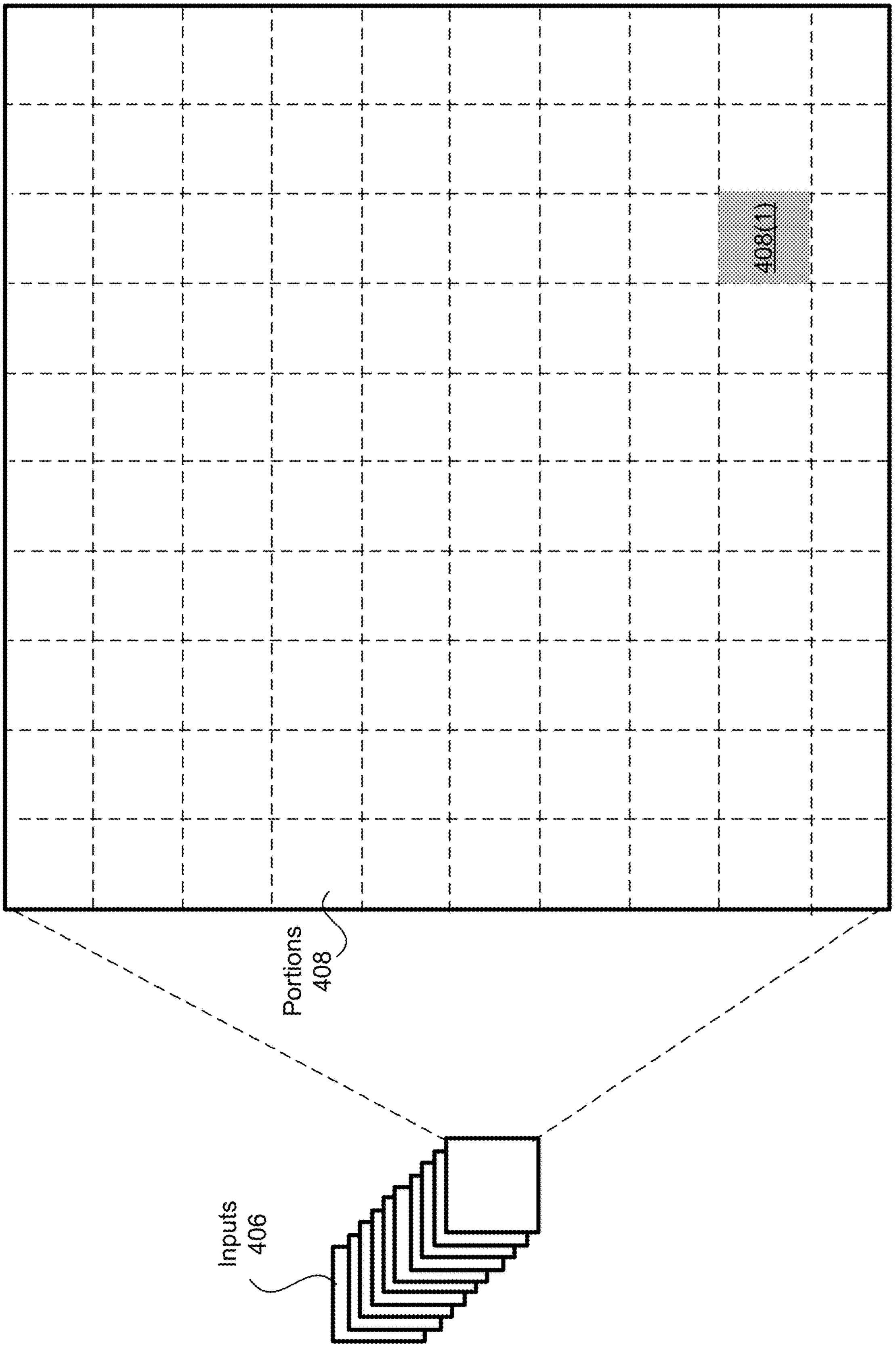

As shown by the example of FIG. 4B, the first input component 120 may generate a second set of inputs 406 (although only one is labeled for clarity reasons) that represent the values of the parameters associated with the object 206(5) as determined by the first processing pipeline 112. In some examples, the first input component 120 uses the first set of inputs 402 for the parameters associated with the object 206(4) and the second set of inputs 406 for the parameters associated with the object 206(5) based on the objects 206(4)-(5) being associated with a same portion of the grids (e.g., the objects 206(4)-(5) are overlapping). For instance, the inputs 406 include portions 408 that correspond to the portions 404 of the inputs 402. Additionally, the portions 408(1) of the inputs 406 that are associated with the object 206(5) corresponds to the portions 404(4) of the inputs 402 that are associated with the object 206(4). As such, the first input component 120 may input the values of the parameters for the object 206(5) within the portions 408(1) of the grids.

Figure 4C:
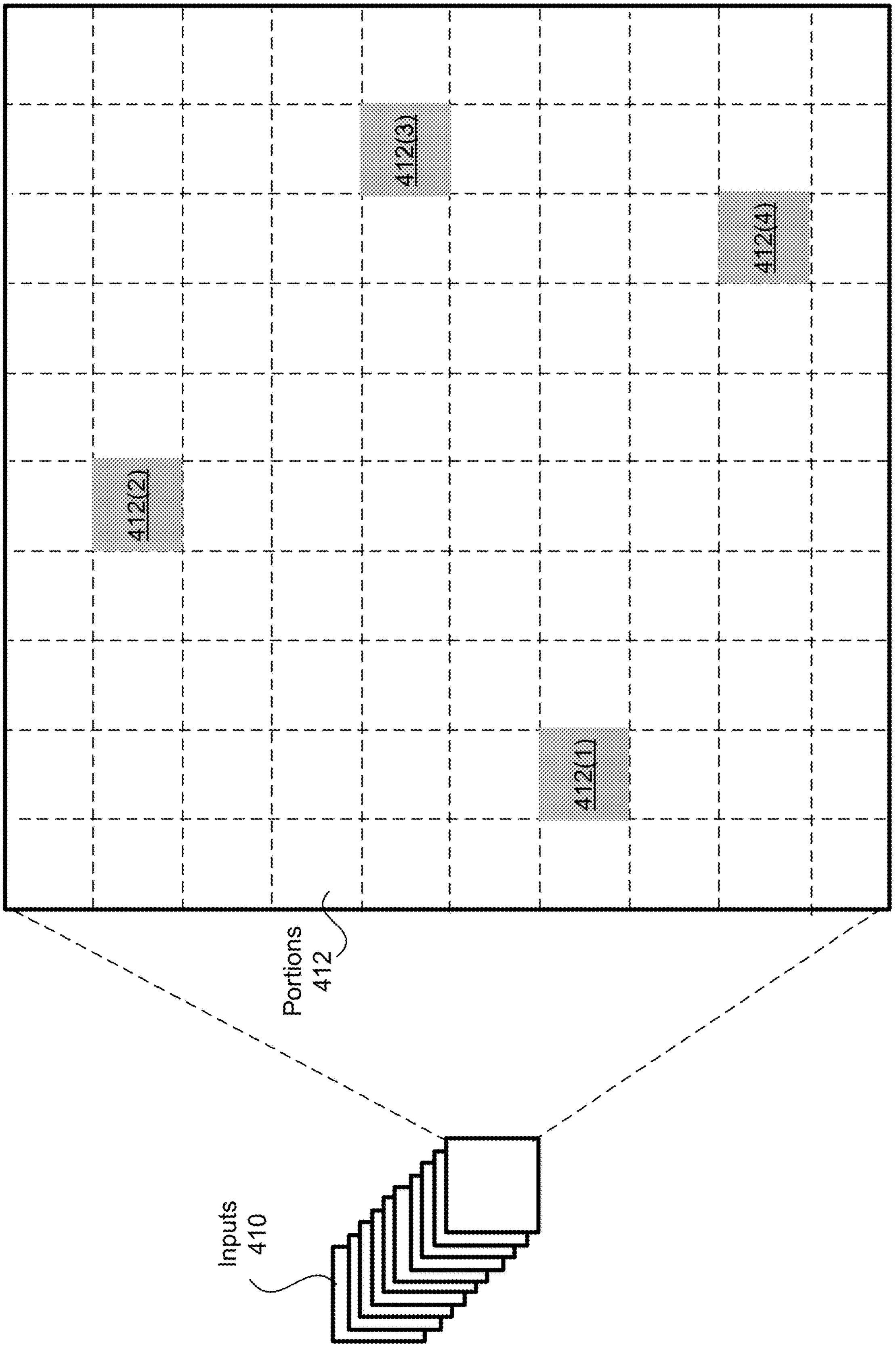

As shown by the example of FIG. 4C, the second input component 124 may generate a third set of inputs 410 (although only one is labeled for clarity reasons) that represent values of the parameters associated with the objects 206(1)-(4) as determined by the second processing pipeline 116. For instance, a first input 410 may represent the values of the x-coordinate locations of the objects 206(1)-(4), a second input 410 may represent the values of the y-coordinate locations of the objects 206(1)-(4), a third input 410 may represent the values of the z-coordinate locations of the objects 206(1)-(4), a fourth input 410 may represent the values of the widths of the objects 206(1)-(4), a fifth input 410 may represent the values of the lengths of the objects 206(1)-(4), a sixth input 410 may represent the value of the heights of the objects 206(1)-(4), a seventh input 410 may represent the values of the x-direction velocities of the objects 206(1)-(4), an eighth input 410 may represent the values of the y-direction velocities of the objects 206(1)-(4), a ninth input 410 may represent the values of the orientations of the objects 206(1)-(4), and a tenth input 410 may represent the values of the classifications associated with the objects 206(1)-(4).

As such, the second input component 124 may perform similar processes as the first input component 120 to input the values of the parameters for the objects 206(1)-(4) into the inputs 410. For instance, the second input component 124 may perform the processes described herein to determine that the object 206(1) is associated with the portions 412(1) of the grids. The second input component 124 may then input the values of the parameters associated with the object 206(1) into the portions 412(1) of the grids. Additionally, the second input component 124 may perform the processes described herein to determine that the object 206(2) is associated with the portions 412(2) of the grids. The second input component 124 may then input the values of the parameters associated with the object 206(2) into the portions 412(2) of the grids. Furthermore, the second input component 124 may perform the processes described herein to determine that the object 206(3) is associated with the portions 412(3) of the grids. The second input component 124 may then input the values of the parameters associated with the object 206(3) into the portions 412(3) of the grids. Moreover, the second input component 124 may perform the processes described herein to determine that the object 206(4) is associated with the portions 412(4) of the grids. The second input component 124 may then input the values of the parameters associated with the object 206(4) into the portions 412(4) of the grids.

Figure 4D:
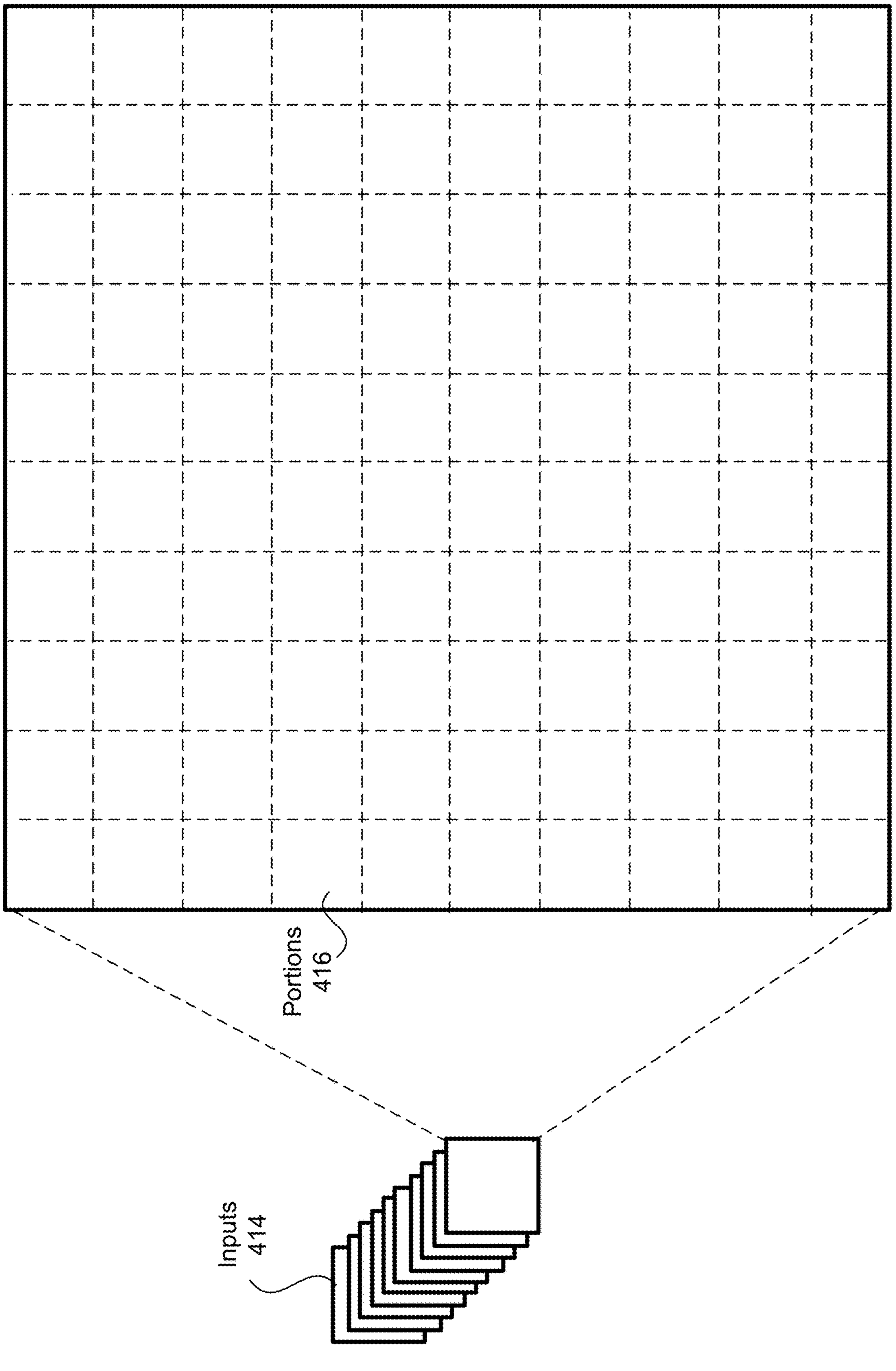

As shown by the example of FIG. 4D, the second input component 124 may generate a fourth set of inputs 414 (although only one is labeled for clarity reasons) associated with overlapping objects, similar to the second set of inputs

406. However, since the second processing pipeline 116 did not determine information 306 associated with the object 206(5), the second input component 124 may not have any values for the parameters to input into the inputs 414. As such, the example of FIG. 4D illustrates portions 416 of the inputs 414 as not including any inputted values.

In the examples of FIGS. 4A-4D, many of the portions 404, 408, 412, and 416 of the inputs 402, 406, 410, and 414 do not include values associated with parameters of the objects 206 (which is indicated by the white squares). As such, in some examples, the first input component 120 and/or the second input component 124 may input set values into those portions 404, 408, 412, and 416. In such examples, the set values may include a value that cannot be associated with any of the parameters, such as a negative value, or the set values may include any other values. Additionally, and as described herein, in some examples, the second object data 118 may not include one or more values for one or more parameters, such as the z-coordinate locations of the objects 206(1)-(4), the heights of the objects 206(1)-(4), and/or the like. Again, in such examples, the second input component 124 may input set values into the portions 412 and 416 of those inputs 410 and 414 that are associated with those parameters. The set values may include a value that cannot be associated with any of the parameters, such as a negative value, or the set values may include any other values. In some examples, by using such set values, the machine learning model(s) 102 may learn to "ignore" those values when generating outputs.

Referring back to the example of FIG. 1, the process 100 may include inputting the input data 122 into the machine learning model(s) 102, where the machine learning model(s) 102 is trained to process the input data 122 in order to fuse the first object data 114 with the second object data 118. The machine learning model(s) 102 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), a large language model (LLM), and/or other types of machine learning models. For instance, the machine learning model(s) 102 may use one or more neural networks to process the input data 122. The neural network(s) may include, but is not limited to, a deep neural network(s), a convolutional neural network(s), a recurrent neural network(s), a generative neural network(s), a modular neural network(s), and/or any other type of neural network(s).

For instance, the machine learning model(s) 102 may include any number and/or type of layers. For example, the machine learning model(s) 102 may include one or more convolutional layers. In some examples, the convolutional layers may compute the output of neurons that are connected to local regions in an input layer, where each neuron computes a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers may include an input layer. The input layer may hold values associated with the input data 122. One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the machine learning model(s) 102 may not include any pooling layers. In such examples, other types of convolution layers may be used in place of pooling layers. In some examples, the feature extractor layer(s) may include alternating convolutional layers and pooling layers.

One or more of the layers may include a fully connected layer. Each neuron in the fully connected layer(s) may be connected to each of the neurons in the previous volume. The fully connected layer may compute class scores, and the resulting volume may be 1×1×N (where N is a number of classes). In some examples, the feature extractor layer(s) may include a fully connected layer, while in other examples, the fully connected layer of the machine learning model(s) 102 may be the fully connected layer separate from the feature extractor layer(s). In some examples, no fully connected layers may be used by the feature extractor layer(s) and/or the machine learning model(s) 102 as a whole, in an effort to increase processing times and reduce computing resource requirements. In such examples, where no fully connected layers are used, the machine learning model(s) 102 may include a fully convolutional network.

One or more of the layers may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer.

Although input layers, convolutional layers, pooling layers, ReLU layers, deconvolutional layers, and fully connected layers are discussed herein with respect to the machine learning model(s) 102, this is not intended to be limiting. For example, the machine learning model(s) 102 may include additional or alternative layers, such as normalization layers, SoftMax layers, and/or other layer types.

In some examples, one or more of the layers may include parameters (e.g., weights and/or biases) while others may not, such as the ReLU layers and pooling layers, for example. In some examples, the parameters may be learned by the machine learning model(s) 102 during training. Further, some of the layers may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

In the example of FIG. 1, based at least on processing the input data 122, the machine learning model(s) 102 may output fused object data 126 representing fused information associated with the object(s). In some examples, the fused information may include fused values for the parameters associated with the object(s). As described herein, the parameters associated with the fused object data 126 for an object may include, but are not limited to, a x-coordinate location, a y-coordinate location, a z-coordinate location, a height, a width, a length, a velocity in the x-direction, a velocity in the y-direction, an orientation, a classification, and/or any other parameter.

In some examples, the fused object data 126 may represent one or more grids, such as similar to the grid(s) represented by the input data 122. For instance, if the input data 122 represents a first number of grids associated with a number of parameters (e.g., ten parameters), then the fused object data 126 may represent a second number of grids associated with the number of parameters. For a first example, if the input data 122 represents twenty grids associated with values for ten different parameters determined using two different types of sensors, then the fused object data 126 may represent ten grids associated with the ten different parameters (e.g., each grid may be associated with one of the parameters). For a second example, if the input data 122 represents forty grids associated with values for the ten different parameters determined using the different types of sensors (e.g., each type of sensor was used to generate two different sets of grids), then the fused object data 126 may represent twenty grids associated with the ten different parameters. In such an example, a first set of the grids may be associated with a first object(s) and a second set of the grids may be associated with a second object(s), such as when there are overlapping objects.

Figure 5A:
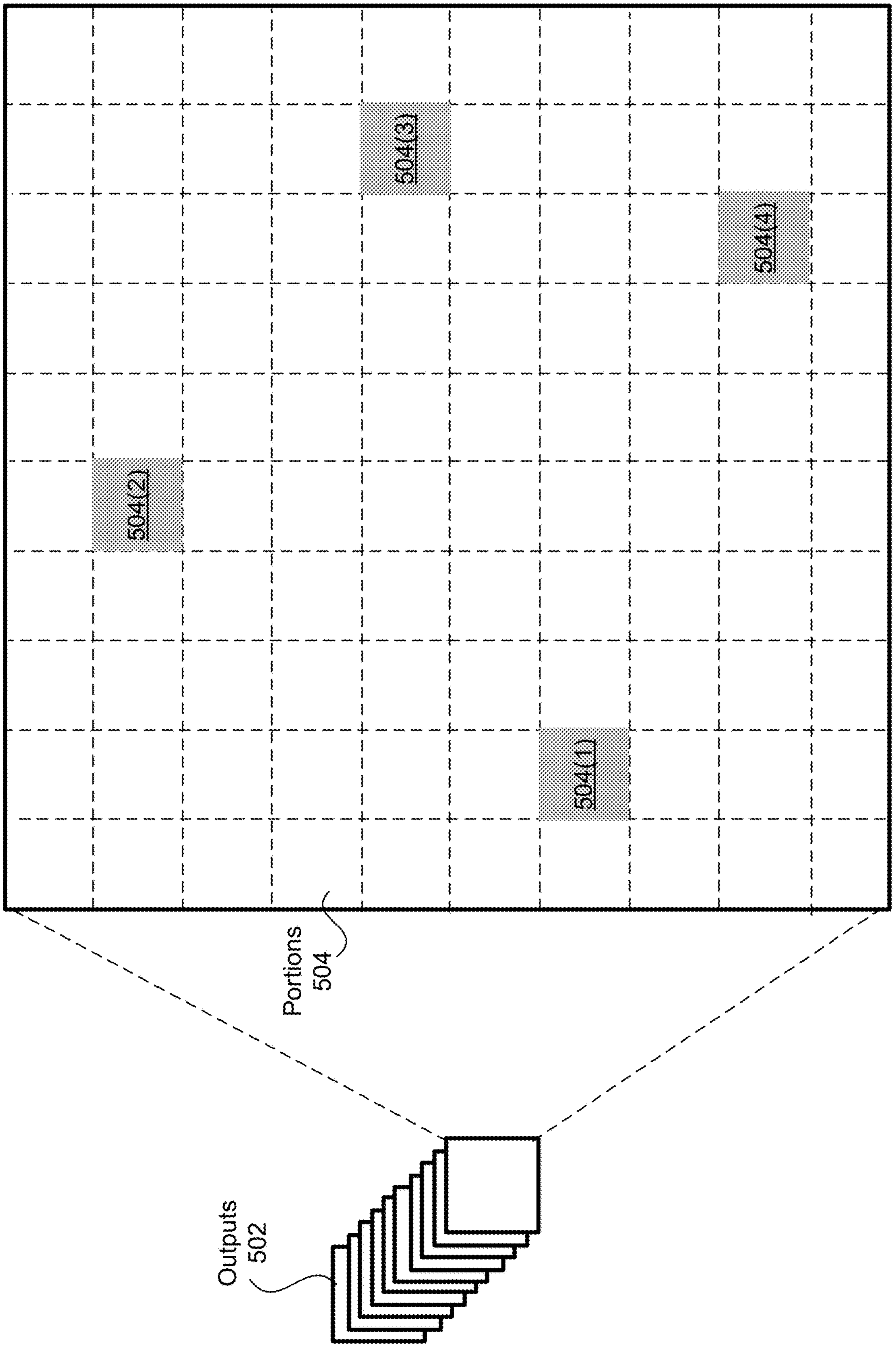
FIGS. 5A-5B illustrate example visualizations of outputs generated using a machine learning model(s), in accordance with some embodiments of the present disclosure.
Figure 5B:
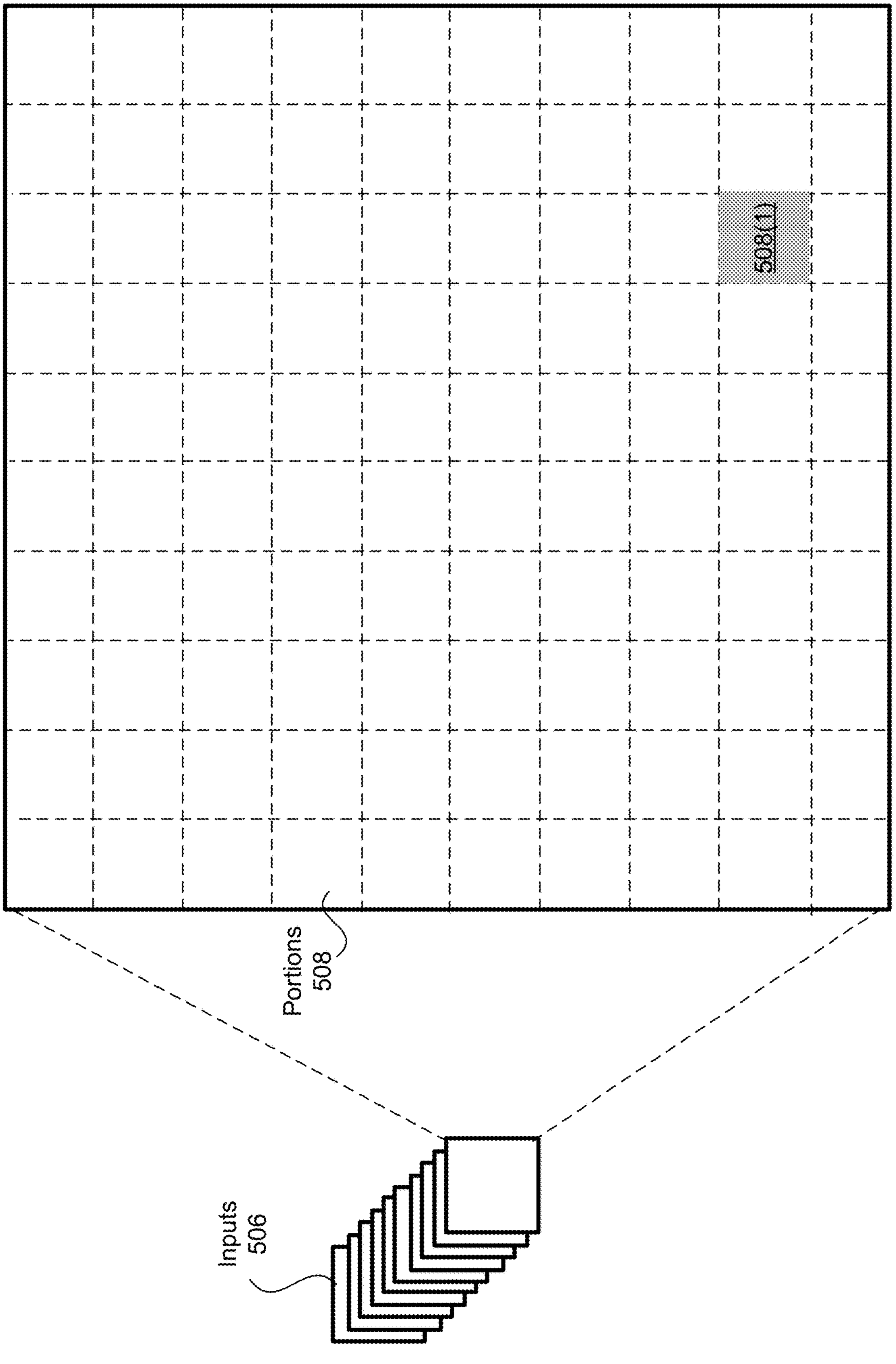

For instance, FIGS. 5A-5B illustrate examples of outputs generated by the machine learning model(s) 102, in accordance with some embodiments of the present disclosure. As shown by the example of FIG. 5A, the machine learning model(s) 102 may generate a first set of outputs 502 (although only one is labeled for clarity reasons) that represent the fused values of the parameters associated with the objects 206(1)-(4). For instance, a first output 502 may represent fused values for the x-coordinate locations of the objects 206(1)-(4), a second output 502 may represent fused values for the y-coordinate locations of the objects 206(1)-(4), a third output 502 may represent fused values for the z-coordinate locations of the objects 206(1)-(4), a fourth output 502 may represent fused values for the widths of the objects 206(1)-(4), a fifth output 502 may represent fused values for the lengths of the objects 206(1)-(4), a sixth output 502 may represent fused values for the heights of the objects 206(1)-(4), a seventh output 502 may represent fused values for the x-direction velocities of the objects 206(1)-(4), an eighth output 502 may represent fused values for the y-direction velocities of the objects 206(1)-(4), a ninth output 502 may represent fused values for the orientations of the objects 206(1)-(4), and a tenth output 502 may represent fused values for the classifications associated with the objects 206(1)-(4).

For instance, and as shown, the outputs 502 may include grids that are separated into portions 504, similar to the inputs 402, 406, 410, and 412. As such, the portions 504(1) of the outputs 502 may indicate the fused values of the parameters associated with the object 206(1), the portions 504(2) of the outputs 502 may indicate the fused values of the parameters associated with the object 206(2), the portions 504(3) of the outputs 502 may indicate the fused values of the parameters associated with the object 206(3), and the portions 504(4) of the outputs 502 may indicate the fused values of the parameters associated with the object 206(4). For example, the portion 504(1) of the first output 502 may indicate the fused value for the x-coordinate location of the object 206(1), where the fused value is determined based at least on the value from the portion 404(1) of the first input 402 and the value from the portion 412(1) of the first input 410. Additionally, the portion 504(1) of the second output 502 may indicate the fused value for the y-coordinate location of the object 206(1), where the fused value is determined based at least on the value from the portion 404(1) of the second input 402 and the value from the portion 412(1) of the second input 410. This may be similar for one or more (e.g., each) of the other values of the parameters and/or for one or more (e.g., each) of the other objects 206(2)-(4).

As shown by the example of FIG. 5B, the machine learning model(s) 102 may generate a second set of outputs 506 (although only one is labeled for clarity reasons) that represent the fused values for the parameters associated with an overlapping object, such as the object 206(5). For instance, a first output 506 may represent a fused value for the x-coordinate location of the object 206(5), a second output 506 may represent a fused value for the y-coordinate location of the object 206(5), a third output 506 may represent a fused value for the z-coordinate location of the object 206(5), a fourth output 506 may represent a fused value for the width of the object 206(5), a fifth output 506 may represent a fused value for the length of the object 206(5), a sixth output 506 may represent a fused value for the height of the object 206(5), a seventh output 506 may represent a fused value for the x-direction velocity of the object 206(5), an eighth output 506 may represent a fused value for the y-direction velocity of the object 206(5), a ninth output 506 may represent a fused value for the orientation of the object 206(5), and a tenth output 506 may represent a fused value for the classification associated with the object 206(5).

For instance, and as shown, the outputs 506 may include grids that are separated into portions 508, similar to the inputs 402, 406, 410, and 412. As such, the portions 508(1) of the outputs 506 may indicate the fused values of the parameters for the object 206(5). For example, the portion 508(1) of the first output 502 may indicate the fused value for the x-coordinate location of the object 206(1), the portion 508(1) of the second output 502 may indicate the fused value for the y-coordinate location of the object 206(5), the portion 508(1) of the third output 502 may indicate the fused value for the z-coordinate location of the object 206(5), and/or so forth.

Referring back to the example of FIG. 1, the process 100 may include one or more additional processing components 128 that process the fused object data 126. In some examples, the processing component(s) 128 may include another fusion component, such as a multi-sensor fusion module, that is also configured to fuse the first sensor data 104 from the first sensor(s) 106 with the second sensor data 108 from the second sensor(s) 110. In such examples, the other fusion component may use the fused object data 126 to supplement the fusion that is already being performed by the other fusion component. In some examples, the processing component(s) 128 may include one or more systems of the vehicle, such as a tracking system that configured to create, update, and/or terminate tracks associated with objects surrounding the vehicle. While these are just a couple examples of what the additional processing component(s) 128 may include, in other examples, the other processing component(s) 128 may include any other type of component, system, algorithm, and/or the like that utilizes the fused object data 126 to perform an operation, a task, and action, and/or the like.

For instance, the fused output data 126 may be used by an autonomous or semi-autonomous driving software stack (which may be represented by the processing component(s) 128) to perform one or more operations by the vehicle (and/or other ego-machine type). For example, the drive stack may include a world model manager that may be used to generate, update, and/or define a world model. The world model manager may use information generated by and received from the perception component(s) of the drive stack. The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager may continually update the world model based on newly generated and/or received inputs (e.g., data) from the obstacle perceiver, the path perceiver, the wait perceiver, the map perceiver, and/or other components of the vehicle. For example, the world model manager and/or the perception components may use the fused output data 126 to perform one or more operations.

The world model may be used to help inform planning component(s), control component(s), obstacle avoidance component(s), and/or actuation component(s) of the drive stack. The obstacle perceiver may perform obstacle perception that may be based on where the vehicle is allowed to drive or is capable of driving, and how fast the vehicle can drive without colliding with an obstacle (e.g., an object, such as a structure, entity, vehicle, etc.) that is sensed by the vehicle (and represented in the fused output data 126, for example).

The path perceiver may perform path perception, such as by perceiving nominal paths that are available in a particular situation. In some examples, the path perceiver may further take into account lane changes for path perception. A lane graph may represent the path or paths available to the vehicle, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle as a result of rules, conventions, and/or practical considerations. For example, the rules, conventions, and/or practical considerations may be in relation to traffic lights, multi-way stops, yields, merges, toll booths, gates, police or other emergency personnel, road workers, stopped busses or other vehicles, one-way bridge arbitrations, ferry entrances, etc. In some examples, the wait perceiver may be responsible for determining longitudinal constraints on the vehicle that require the vehicle to wait or slow down until some condition is true. In some examples, wait conditions arise from potential obstacles, such as crossing traffic in an intersection, that may not be perceivable by direct sensing by the obstacle perceiver, for example (e.g., by using sensor data from the sensors, because the obstacles may be occluded from field of views of the sensors). As a result, the wait perceiver may provide situational awareness by resolving the danger of obstacles that are not always immediately perceivable through rules and conventions that can be perceived and/or learned. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale.

The planning component(s) may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints). The waypoints may be representative of a specific distance into the future for the vehicle, such as a number of city blocks, a number of kilometers/miles, a number of meters/feet, etc., that may be used as a target for the lane planner.

The lane planner may use the lane graph (e.g., the lane graph from the path perceiver, which may be generated using, at least in part, the fused output data 126), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) may follow a trajectory or path (lateral and longitudinal) that has been received from the behavior selector of the planning component(s) as closely as possible and within the capabilities of the vehicle.

The obstacle avoidance component(s) may aid the vehicle in avoiding collisions with objects (e.g., moving and stationary objects). In some examples, the obstacle avoidance component(s) may be used independently of components, features, and/or functionality of the vehicle that is required to obey traffic rules and drive courteously. In such examples, the obstacle avoidance component(s) may ignore traffic laws, rules of the road, and courteous driving norms in order to ensure that collisions do not occur between the vehicle and any objects. As such, the obstacle avoidance layer may be a separate layer from the rules of the road layer, and the obstacle avoidance layer may ensure that the vehicle is only performing safe actions from an obstacle avoidance standpoint. The rules of the road layer, on the other hand, may ensure that vehicle obeys traffic laws and conventions, and observes lawful and conventional right of way.

While the example of FIG. 1 illustrates performing data fusion using the first sensor data 104 generated using the first sensor(s) 106 and the second sensor data 108 generated using the second sensor(s) 110, in other examples, the process 100 may include performing data fusion using additional sensor data generated using one or more additional sensors. For example, third sensor data may be generated using one or more third sensors, where the third sensor(s) includes a third type of sensor that is different than the first type of sensor associated with the first sensor(s) 106 and the second type of sensor associated with the second sensor(s) 110. A third processing pipeline may then process the third sensor data in order to generate third object data representing third values for third parameters associated with one or more third objects. Additionally, a third input component (and/or the first input component 120 and/or the second input component 124) may then process the third object data to generate third input data 122 for input into the machine learning model(s) 102.

Additionally, in some examples, the process 100 may continue to repeat using new sensor data 104 and 108 generated using the sensors 106 and 110 in order to continue determining updated information associated with the environment surrounding the vehicle. For instance, if the sensor data 104 and 108 is associated with a frame rate, then the process 100 may repeat based on the frame rate. For a first example, if the frame rate associated with at least one of the first sensor data 104 or the second sensor data 108 is 30 frames per second, then the process 100 may repeat 30 times a second (e.g., with each frame). For a second example, if the frame rate associated with at least one of the first sensor data 104 or the second sensor data 108 is again 30 frames per second, then the process 100 may repeat 15 time a second (e.g., with every other frame).

Figure 6:
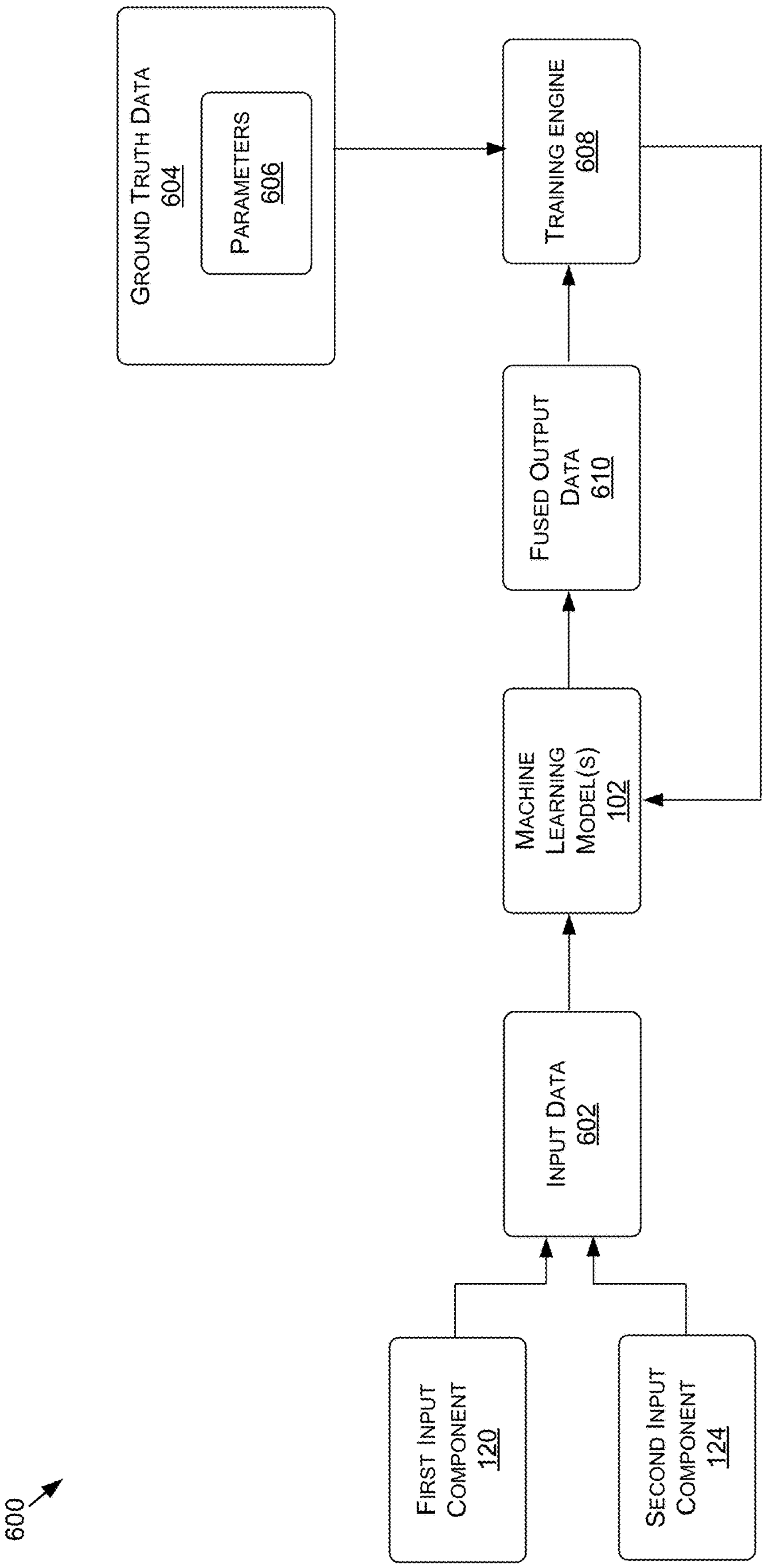
FIG. 6 illustrates a data flow diagram illustrating a process for training a machine learning model(s) to perform data fusion, in accordance with some embodiments of the present disclosure.

Now referring to FIG. 6, FIG. 6 is a data flow diagram illustrating a process 600 for training the machine learning model(s) 102 to fuse data, in accordance with some embodiments of the present disclosure. As shown, the machine learning model(s) 102 may be trained using input data 602 (e.g., training input data). The input data 602 may be generated by the first input component 120 and the second input component 124, similar to the input data 122 (e.g., the input data 702 may represent grids indicating the values of the parameters associated with one or more objects). For example, the first input component 120 may process first object data that is generated using the first processing pipeline 112 (and/or another processing pipeline) using a first type of sensor data (e.g., the first sensor data 104). Based at least on the processing, the first input component 120 may generate a first portion of the input data 602. Additionally, the second input component 124 may process second object data that is generated using the second processing pipeline 116 (and/or another processing pipeline) using a second type of sensor data (e.g., the second sensor data 108). Based at least on the processing, the second input component 124 may generate a second portion of the input data 602.

The machine learning model(s) 102 may be trained using the training input data 602 as well as corresponding ground truth data 604. The ground truth data 604 may include annotations, labels, masks, and/or the like. For example, in some embodiments, the ground truth data 604 may indicate actual values of the parameters 606 associated with the object(s) within the environment. For instance, and for an object, the parameters 606 may include, but are not limited to, a x-coordinate location, a y-coordinate location, a z-coordinate location, a height, a width, a length, a velocity in the x-direction, a velocity in the y-direction, an orientation, a classification, and/or any other parameter. The ground truth data 604 may be generated within a drawing program (e.g., an annotation program), a computer aided design (CAD) program, a labeling program, another type of program suitable for generating the ground truth data 604, and/or may be hand drawn, in some examples. In any example, the ground truth data 604 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer).

A training engine 608 may use one or more loss functions that measure loss (e.g., error) in fused output data 610 (which may be similar to the fused output data 126) generated by the machine learning model(s) 102 as compared to the ground truth data 604. Any type of loss function may be used, such as cross entropy loss, mean squared error, mean absolute error, mean bias error, and/or other loss function types. In some examples, different outputs may have different loss functions. For example, the x-coordinate location may include a first loss, the y-coordinate location may include a second loss, the z-coordinate location may include a third loss, and/or so forth. In such examples, the loss functions may be combined to form a total loss, and the total loss may be used to train (e.g., update the parameters of) the machine learning model(s) 102. In any example, backward pass computations may be performed to recursively compute gradients of the loss function(s) with respect to training parameters. In some examples, weight and biases of the machine learning model(s) 102 may be used to compute these gradients.

Figure 7:
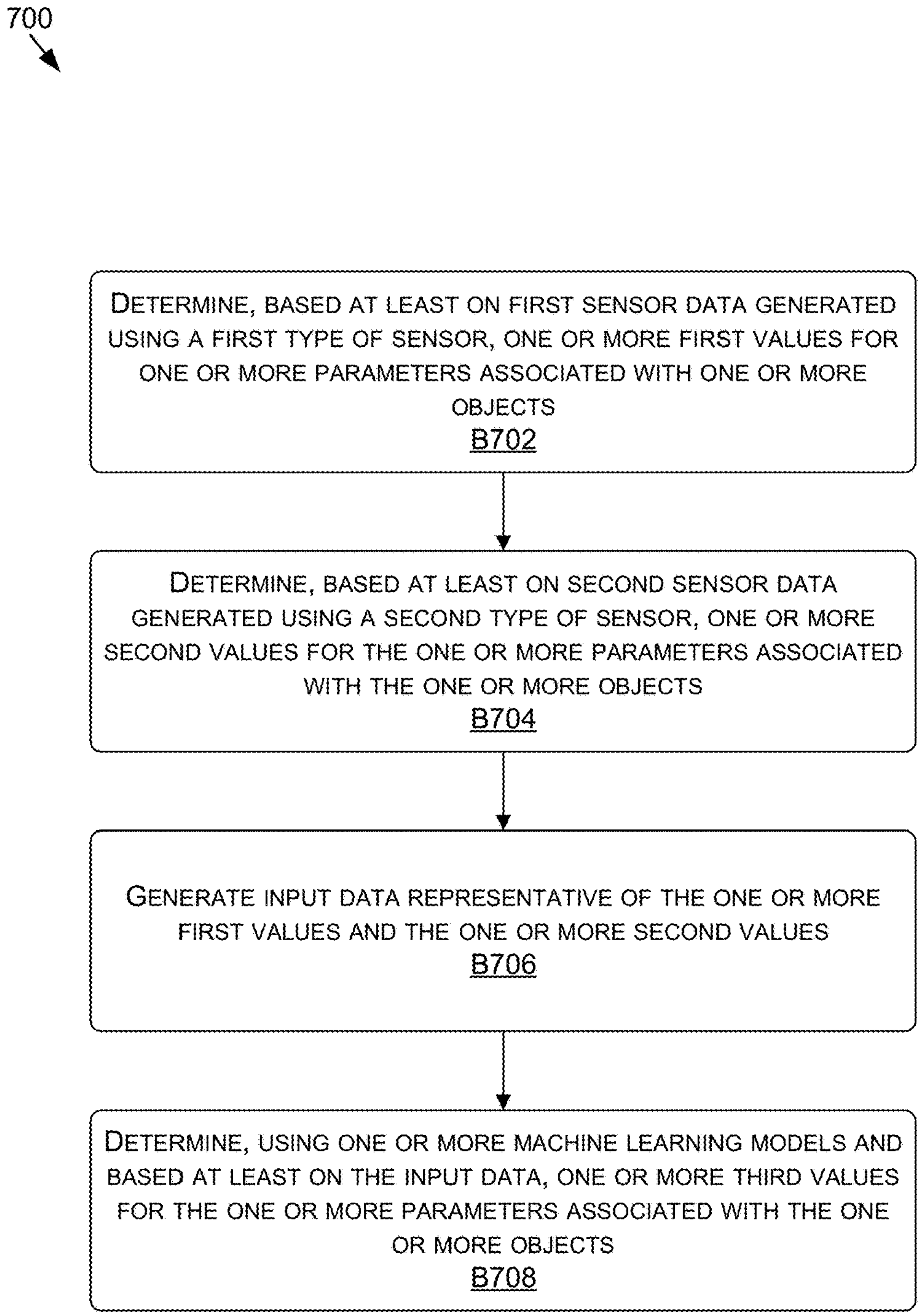
FIG. 7 illustrates a flow diagram showing a method for performing data fusion using a machine learning model(s), in accordance with some embodiments of the present disclosure.
Figure 8:
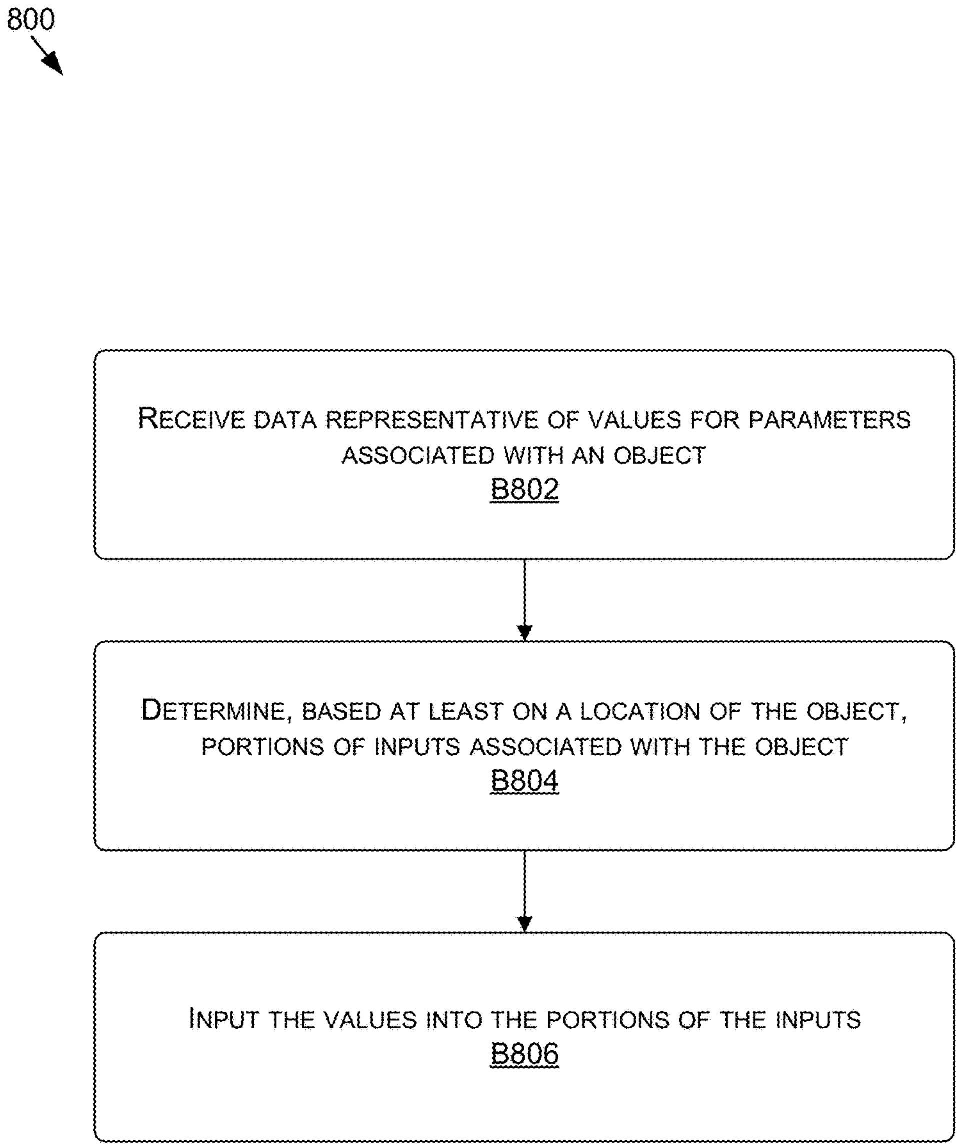
FIG. 8 illustrates a flow diagram showing a method for generating input data for a machine learning model(s), in accordance with some embodiments of the present disclosure.

Now referring to FIGS. 7 and 8, each block of the methods 700 and 800, described herein, comprises a computing process that may be performed using any combination of hardware, firmware, and/or software. For instance, various functions may be carried out by a processor executing instructions stored in memory. The methods 700 and 800 may also be embodied as computer-usable instructions stored on computer storage media. The methods 700 and 800 may be provided by a standalone application, a service or hosted service (standalone or in combination with another hosted service), or a plug-in to another product, to name a few. In addition, the methods 700 and 800 are described, by way of example, with respect to FIG. 1. However, these methods 700 and 800 may additionally or alternatively be executed by any one system, or any combination of systems, including, but not limited to, those described herein.

FIG. 7 illustrates a flow diagram showing a method 700 for performing data fusion using a machine learning model(s), in accordance with some embodiments of the present disclosure. The method 700, at block B702, may include determining, based at least on first sensor data generated using a first type of sensor, one or more first values for one or more parameters associated with one or more objects. For instance, the first processing pipeline 112 may process the first sensor data 104 generated using the first sensor(s) 106. Based at least on the processing, the first processing pipeline 112 may generate the first object data 114 representing the first value(s) for the parameter(s) associated with the object(s). For instance, and for an object, the parameters may include, but are not limited to, a x-coordinate location, a y-coordinate location, a z-coordinate location, a height, a width, a length, a velocity in the x-direction, a velocity in the y-direction, an orientation, a classification, and/or any other parameter.

The method 700, at block B704, may include determining, based at least on second sensor data generated using a second type of sensor, one or more second values for the one or more parameters associated with the one or more objects.

For instance, the second processing pipeline 116 may process the second sensor data 108 generated using the second sensor(s) 110. Based at least on the processing, the second processing pipeline 116 may generate the second object data 118 representing the second value(s) for the parameter(s) associated with the object(s). In some examples, one or more values of the second value(s) are the same as one or more values of the first value(s). In some examples, one or more values of the second value(s) are different than one or more values of the first value(s).

The method 700, at block B706, may include generating input data representative of the one or more first values and the one or more second values. For instance, the first input component 120 may process the first object data 114 and, based at least on the processing, generate a first portion of the input data 122. Additionally, the second input component 124 may process the second object data 118 and, based at least on the processing, generate a second portion of the input data 122. As described herein, the input data 122 may represent one or more grids indicating the first value(s) and the second value(s) of the parameter(s).

The method 700, at block B708, may include determining, using one or more machine learning models and based at least on the input data, one or more third values for the one or more parameters associated with the one or more objects. For instance, the machine learning model(s) 102 may process the input data 122 and, based at least on the processing, generate the fused object data 126 representing the third value(s) of the parameter(s). In some examples, the fused object data 126 may represent one or more grids indicating the third value(s) of the parameter(s).

FIG. 8 is a flow diagram showing a method 800 for generating input data for a machine learning model(s), in accordance with some embodiments of the present disclosure. The method 800, at block B802, may include receiving data representative of values for parameters associated with an object. For instance, the first input component 120 may receive the first object data 114 representing the values for the parameters associated with the object. As described herein, for the object, the parameters may include, but are not limited to, a x-coordinate location, a y-coordinate location, a z-coordinate location, a height, a width, a length, a velocity in the x-direction, a velocity in the y-direction, an orientation, a classification, and/or any other parameter.

The method 800, at block B804, may include determining, based at least on a location of the object, portions of input associated with the object. For instance, the first input component 120 may use the location of the object to determine the portions of the inputs that are associated with the object. For example, the inputs may include grids that represent a segment of an environment. The grids may then be separated into various portions, where respective portions of the grids represent areas of the environment. As such, the first input component 120 may use the location of the object to determine the portions of the grids that are associated with the area of the environment for which the object is located.

The method 800, at block B806, may include inputting the values into the portions of the inputs. For instance, the first input component 120 may input the values into the portions of the inputs. For example, the first input component 120 may input the value associated with the x-coordinate location into the portion of a first input, input the value associated with the y-coordinate location into the portion of the second input, input the value associated with the z-coordinate location into the portion of the third input, and/or so forth. In some examples, the first input component 120 may perform similar processes in order to input additional values for the parameters associated with one or more additional objects. In some examples, the second input component 124 may further perform similar processes using the second object data 118 in order to generate inputs representing additional values for the parameters associated with the object.

Example Autonomous Vehicle

Figure 9A:
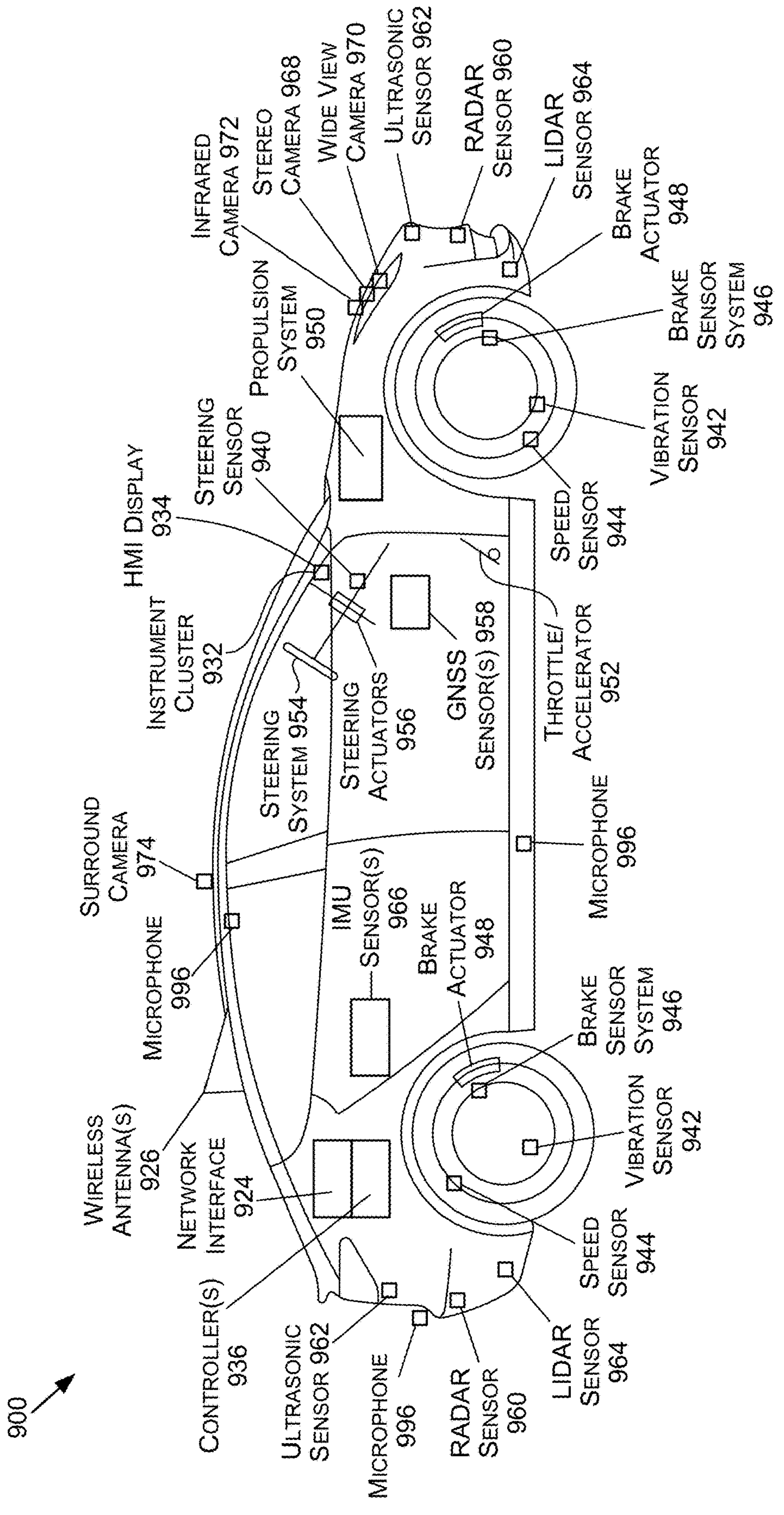
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LiDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
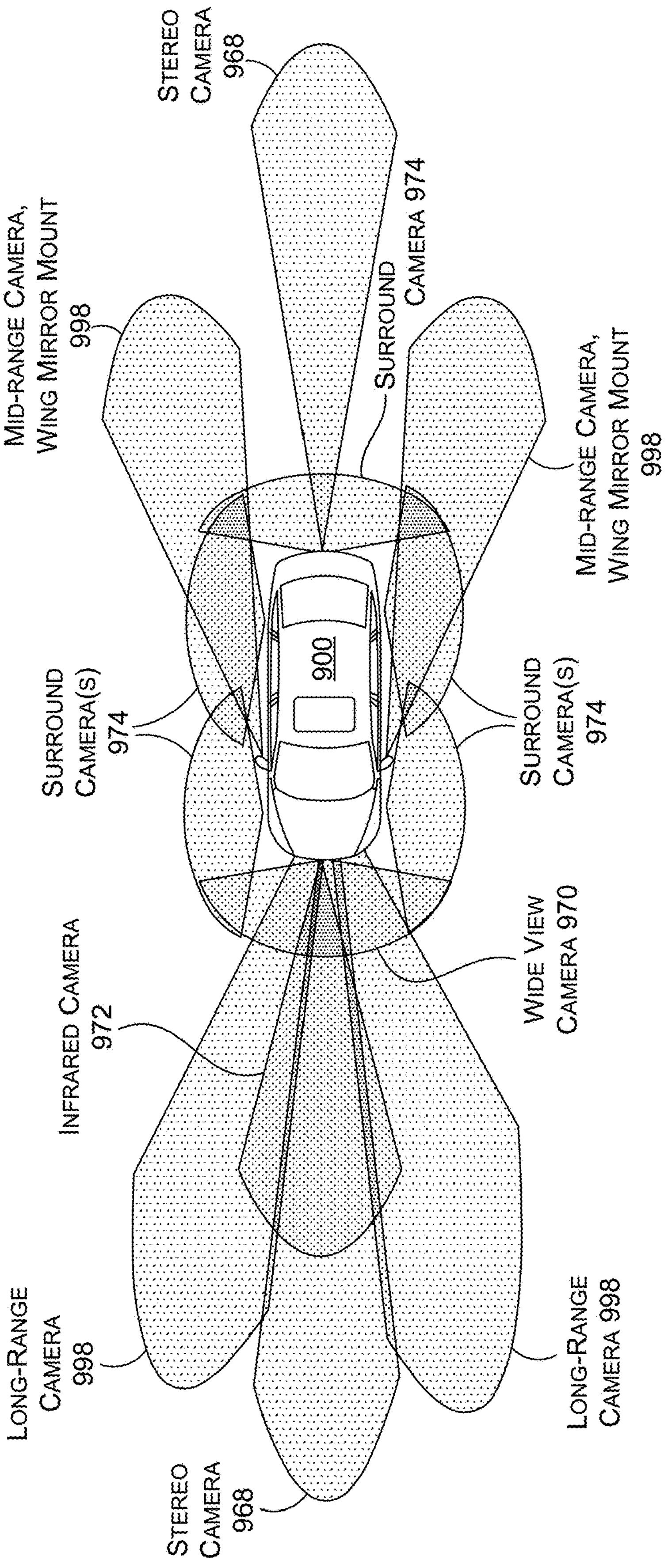
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
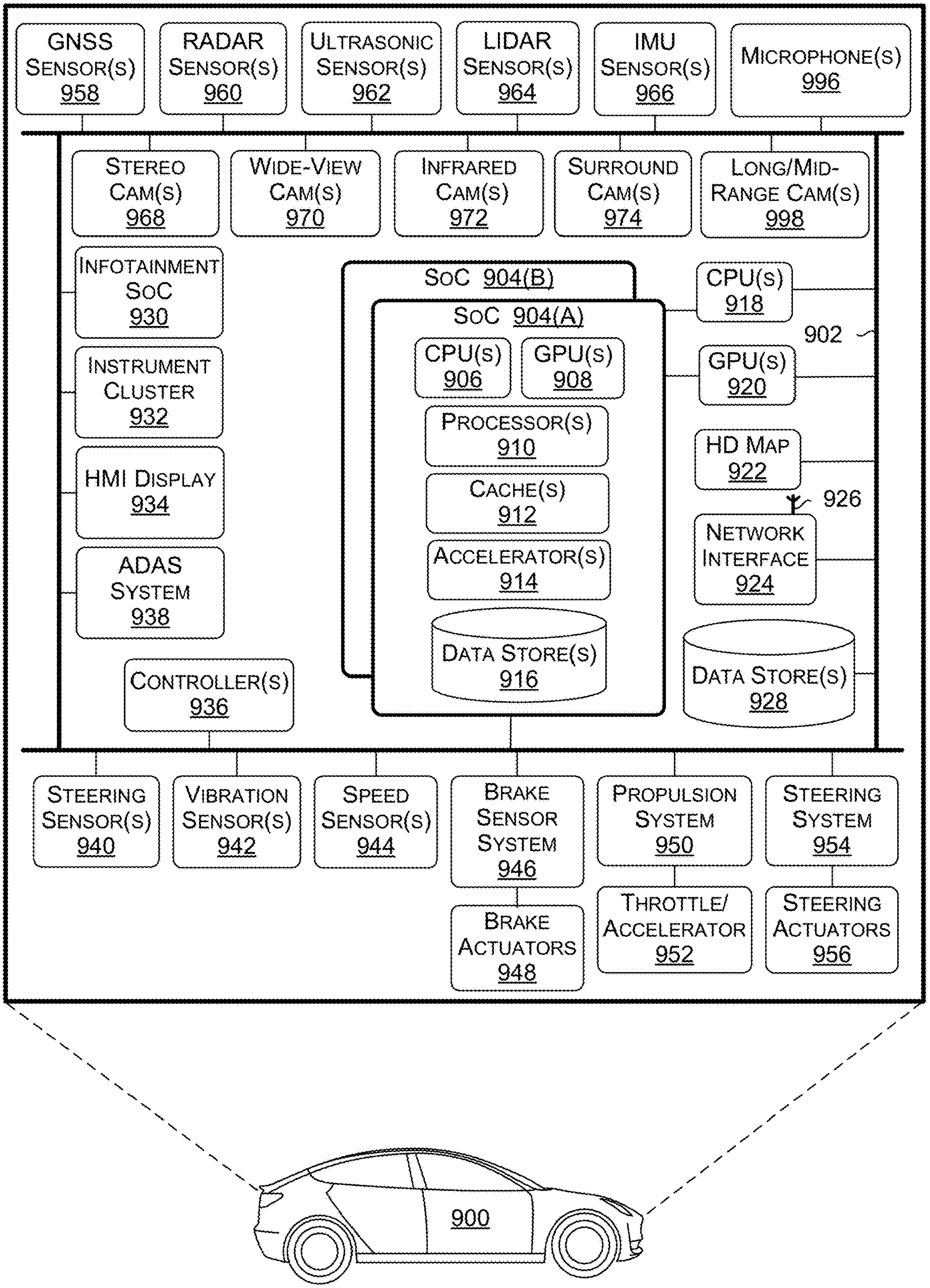
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LiDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LiDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LiDAR sensor(s) 964. The LiDAR sensor(s) 964 may be used for object and pedestrian detection, emergency braking, collision avoidance, and/or other functions. The LiDAR sensor(s) 964 may be functional safety level ASIL B. In some examples, the vehicle 900 may include multiple LiDAR sensors 964 (e.g., two, four, six, etc.) that may use Ethernet (e.g., to provide data to a Gigabit Ethernet switch).

In some examples, the LiDAR sensor(s) 964 may be capable of providing a list of objects and their distances for a 360-degree field of view. Commercially available LiDAR sensor(s) 964 may have an advertised range of approximately 900 m, with an accuracy of 2 cm-3 cm, and with support for a 900 Mbps Ethernet connection, for example. In some examples, one or more non-protruding LiDAR sensors 964 may be used. In such examples, the LiDAR sensor(s) 964 may be implemented as a small device that may be embedded into the front, rear, sides, and/or corners of the vehicle 900. The LiDAR sensor(s) 964, in such examples, may provide up to a 120-degree horizontal and 35-degree vertical field-of-view, with a 200 m range even for low-reflectivity objects. Front-mounted LiDAR sensor(s) 964 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 900. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LiDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
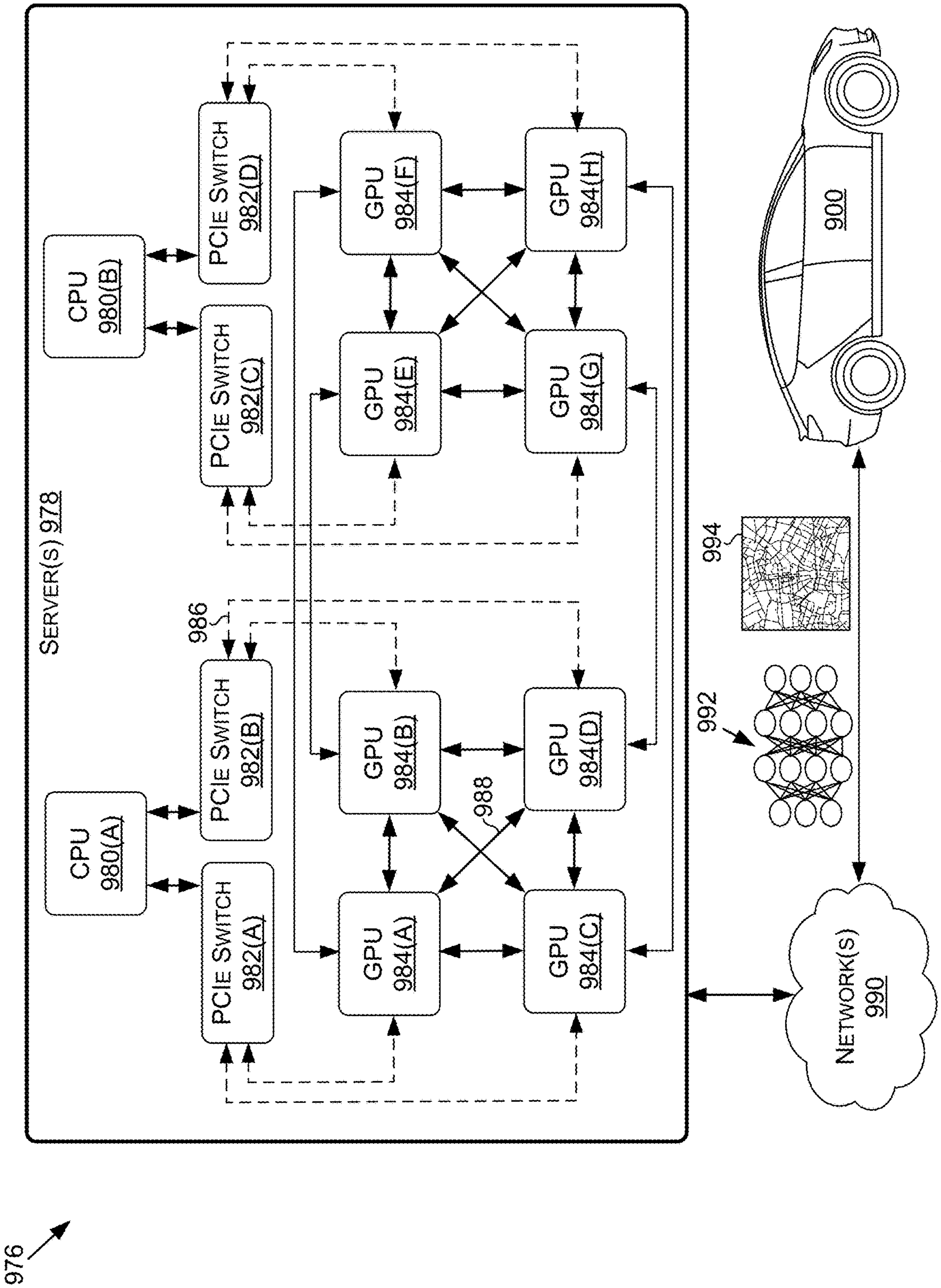
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
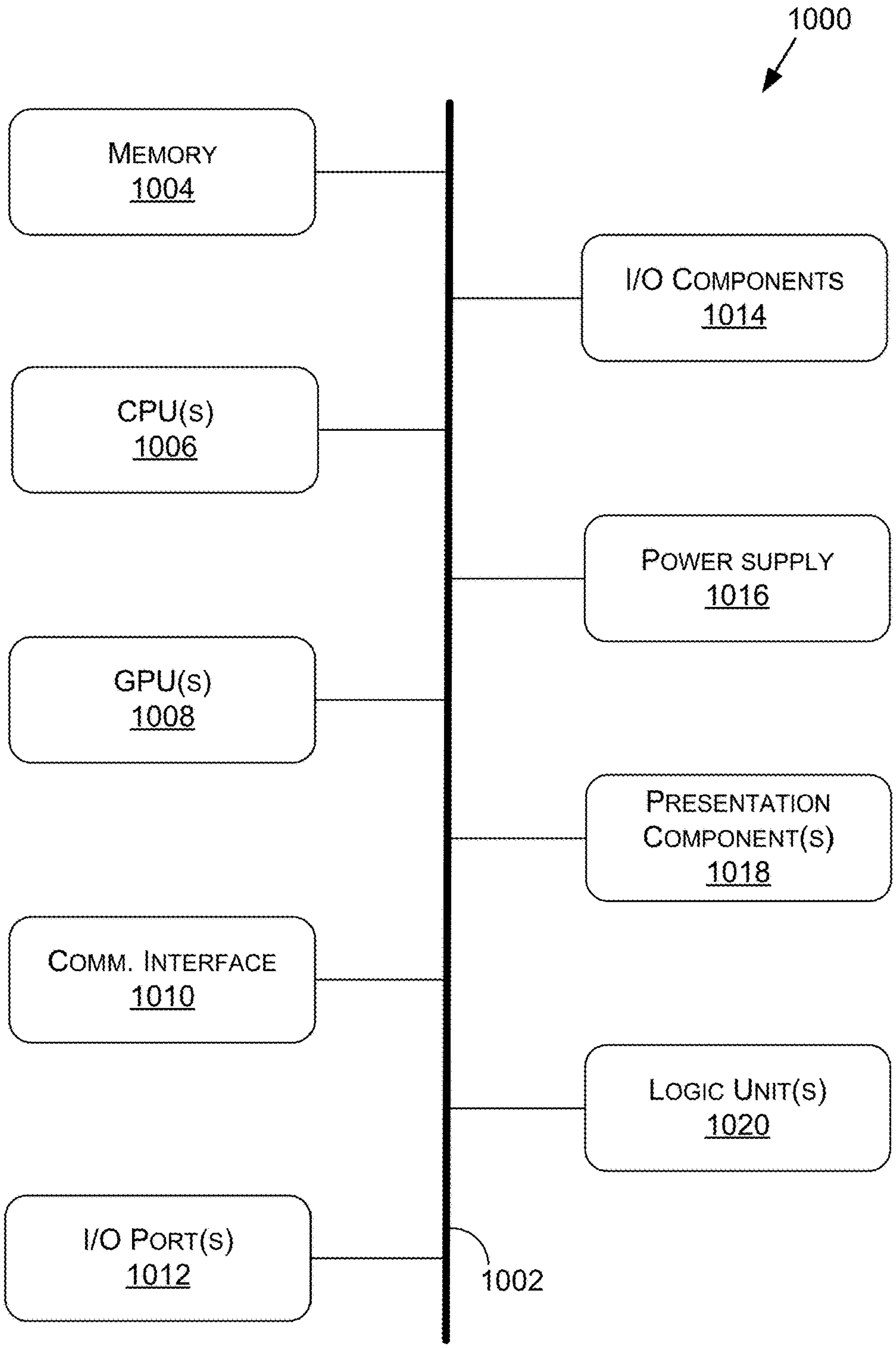
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
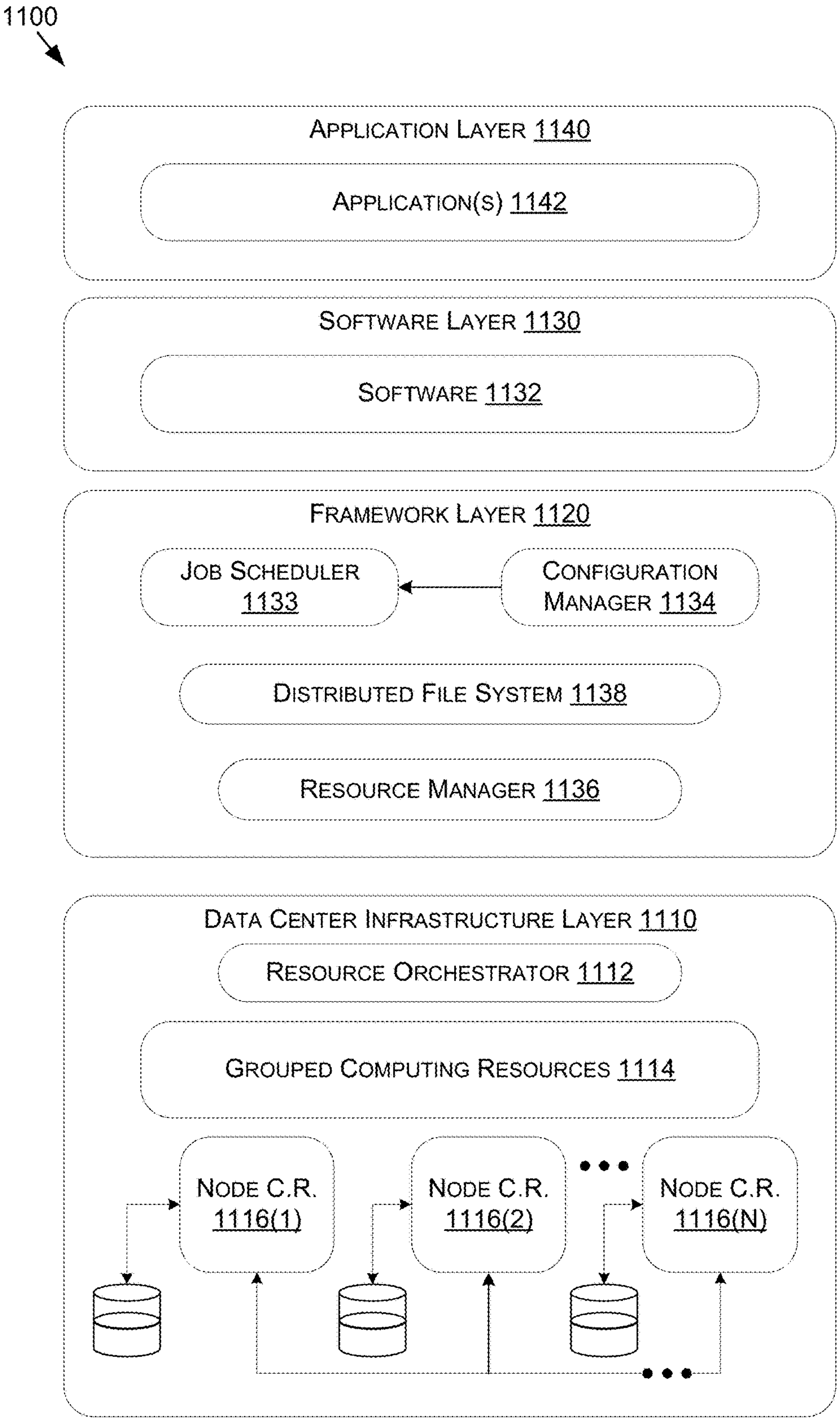
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, based at least on first sensor data obtained using a first type of sensor, first values for parameters associated with an object located within an environment at a first instance in time;

determining, based at least on second sensor data obtained using a second type of sensor, second values for the parameters associated with the object at a second instance in time;

generating input data representative of at least:

a plurality of first grids associated with the first type of sensor, the plurality of first grids indicating the first values for the parameters within first portions of the plurality of first grids that are associated with a location of the object within the environment; and a plurality of second grids associated with the second type of sensor, the plurality of second grids indicating the second values for the parameters within second portions of the plurality of second grids that are associated with the location of the object within the environment;

determining, using one or more neural networks and based at least on the input data, third values for the parameters associated with the object; and causing a machine to navigate within the environment based at least on the third values for the parameters.

2. The method of claim 1, wherein:

an individual first grid of the plurality of first grids is associated with an individual parameter of the parameters; and an individual second grid of the plurality of second grids is associated with the individual parameter of the parameters.

3. The method of claim 1, wherein:

the plurality of first grids includes a number of grids that corresponds to a number of parameters from the parameters; and the plurality of second grids includes the number of grids that corresponds to the number of parameters from the parameters.

4. The method of claim 1, wherein the determining the third values for the parameters associated with the object comprises:

generating, using the one or more neural networks and based at least on the input data, output data representative of a plurality of third grids, plurality of third grids indicating the third values for the parameters within third portions of the plurality of third grids that are associated with the location of the object within the environment; and determining, based at least on the plurality of third grids, the third values for the parameters associated with the object.

5. The method of claim 1, wherein:

the determining the first values for the parameters associated with the object uses a first processing pipeline that is associated with the first type of sensor; and the determining the second values for the parameters associated with the object uses a second processing pipeline that is associated with the second type of sensor.

6. The method of claim 1, wherein the parameters include one or more of:

a first location associated with a first direction;

a second location associated with a second direction;

a third location associated with a third direction;

a height;

a width;

a length;

a first velocity in the first direction;

a second velocity in the second direction;

an orientation;

a pose; or a classification.

7. The method of claim 1, wherein:

the input data is further representative of:

a third grid associated with the first type of sensor, the third grid indicating at least a fourth value for a parameter of the parameters, the third grid being associated with a second object; and a fourth grid associated with the second type of sensor, the fourth grid indicating at least a fifth value for the parameter of the parameters, the fourth grid being associated with the second object.

8. The method of claim 7, wherein:

the third grid indicates the fourth value at a third portion of the third grid that is associated with a second location of the second object within the environment.

9. The method of claim 1, wherein:

each first grid of the plurality of first grids is associated with a respective parameter of the parameters; and each second grid of the plurality of second grids is associated with the respective parameter of the parameters.

10. A system comprising:

one or more processors to:

receive first data representative of first values for parameters associated with an object, the first data obtained using first sensor data associated with a first type of sensor;

receive second data representative of second values for the parameters associated with the object, the second data obtained using second sensor data associated with a second type of sensor;

generate input data representative of at least:

a plurality of first grids, an individual first grid of the plurality of first grids being associated with an individual parameter of the parameters and indicating an individual first value of the first values for the individual parameter; and a plurality of second grids, an individual grid of the plurality of second grids being associated with the individual parameter of the parameters and indicating an individual second value of the second values for the individual parameter;

determine, using one or more neural networks and based at least on the input data, third values for the parameters associated with the object; and cause a machine to navigate within an environment based at least on the third values.

11. The system of claim 10, wherein:

the plurality of first grids indicate the first values for the parameters at first portions of the plurality of first grids, the first portions corresponding to a location of the object; and the plurality of second grids indicate the second values for the parameters at second portions of the plurality of second grids, the second portions corresponding to the location.

12. The system of claim 10, wherein:

the plurality of first grids includes a number of grids that corresponds to a number of parameters from the parameters; and the plurality of second grids includes the number of grids that corresponds to the number of parameters from the parameters.

13. The system of claim 10, wherein the determination of the third values for the parameters associated with the object comprises:

generating, using the one or more neural networks and based at least on the input data, output data representative of outputs, an individual output of the outputs indicating a third value from the third values, the third value being associated with a parameter of the parameters; and determining, based at least on the outputs, the third values for the parameters associated with the object.

14. The system of claim 10, wherein:

the first values for the parameters associated with the object are generated using a first processing pipeline that is associated with the first type of sensor; and the second values for the parameters associated with the object are generated using a second processing pipeline that is associated with the second type of sensor.

15. The system of claim 10, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

16. The system of claim 10, wherein the input data is further representative of:

one or more third grids that indicate one or more fourth values for one or more of the parameters associated with one or more second objects; and one or more fourth grids that indicate one or more fifth values for the one or more of the parameters associated with the one or more second objects.

17. The system of claim 10, wherein the determination of the third values for the parameters associated with the object comprises:

generating, using the one or more neural networks and based at least on the input data, output data representative of third grids that indicate the third values for the parameters; and determining, based at least on the third grids, the third values for the parameters associated with the object.

18. The system of claim 10, wherein:

each first grid of the plurality of first grids is associated with a respective parameter of the parameters; and each second grid of the plurality of second grids is associated with the respective parameter of the parameters.

19. A processor comprising processing circuitry to:

receive first data representative of first values for parameters associated with an object, the first data obtained using first sensor data associated with a first type of sensor;

receive second data representative of second values for the parameters associated with the object, the second data obtained using second sensor data associated with a second type of sensor;

generate input data representative of at least:

a plurality of first grids, an individual first grid of the plurality of first grids being associated with an individual parameter of the parameters and indicating an individual first value of the first values for the individual parameter; and a plurality of second grids, an individual grid of the plurality of second grids being associated with the individual parameter of the parameters and indicating an individual second value of the second values for the individual parameter;

determine, using one or more neural networks and based at least on the input data, third values for the parameters associated with the object; and cause a machine to navigate within an environment based at least on the e third values.

20. The processor of claim 19, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

* * * * *